United States Patent
Hirschmann et al.

(10) Patent No.: US 7,807,236 B2
(45) Date of Patent: *Oct. 5, 2010

(54) LIQUID-CRYSTALLINE MEDIUM

(75) Inventors: Harald Hirschmann, Darmstadt (DE); Michael Wittek, Darmstadt (DE); Markus Czanta, Darmstadt (DE); Volker Reiffenrath, Rossdorf (DE)

(73) Assignee: Merck Patent Gesellschaft, Darmstadt (DE)

( * ) Notice: Subject to any disclaimer, the term of this patent is extended or adjusted under 35 U.S.C. 154(b) by 205 days.

This patent is subject to a terminal disclaimer.

(21) Appl. No.: 12/024,266

(22) Filed: Feb. 1, 2008

(65) Prior Publication Data
US 2008/0199635 A1    Aug. 21, 2008

(30) Foreign Application Priority Data
Feb. 2, 2007   (DE) .................... 10 2007 005 317

(51) Int. Cl.
- *C09K 19/34* (2006.01)
- *C09K 19/30* (2006.01)
- *C09K 19/12* (2006.01)
- *C09K 19/20* (2006.01)
- *C07C 25/13* (2006.01)
- *C07C 43/225* (2006.01)

(52) U.S. Cl. .............. 428/1.1; 252/299.61; 252/299.63; 252/299.66; 252/299.67; 570/128; 570/144

(58) Field of Classification Search ................. 428/1.1; 252/299.61, 299.63, 299.66, 299.67; 570/128, 570/144
See application file for complete search history.

(56) References Cited

U.S. PATENT DOCUMENTS

| | | | | |
|---|---|---|---|---|
| 5,403,512 | A | * | 4/1995 | Bartmann et al. ...... 252/299.01 |
| 6,159,393 | A | * | 12/2000 | Tarumi et al. .......... 252/299.63 |
| 7,595,101 | B2 | * | 9/2009 | Wittek et al. ................. 428/1.1 |

FOREIGN PATENT DOCUMENTS

| | | |
|---|---|---|
| DE | 43 14 085 A1 | 11/1994 |
| DE | 44 34 976 A1 | 4/1996 |
| DE | 44 45 224 A1 | 6/1996 |
| DE | 103 40 534 A1 | 4/2004 |
| WO | WO 92/21734 A1 | 12/1992 |
| WO | WO 2006/133783 A1 | 12/2006 |

* cited by examiner

*Primary Examiner*—Shean C Wu
(74) *Attorney, Agent, or Firm*—Millen, White, Zelano, Branigan, P.C.

(57) ABSTRACT

The invention relates to a liquid-crystalline medium, characterised in that it comprises one or more compounds of the formula I

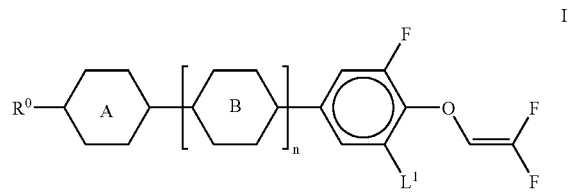

in which $R^0$, $L^1$, n, A and B have the meanings indicated in Claim 1, furthermore to novel compounds of the formula I, to processes for the preparation thereof, to the use thereof in electronic and electro-optical devices, in particular in LC displays, and to LC displays containing same.

26 Claims, No Drawings

LIQUID-CRYSTALLINE MEDIUM

The present invention relates to liquid-crystalline media (LC media) comprising one or more compounds containing an —O—CH=CF$_2$— end group, to novel compounds of this type, to processes for the preparation thereof, to the use of the LC media and compounds for electro-optical purposes, and to LC displays containing such LC media and compounds.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure. In addition, there are also cells which work with an electric field parallel to the substrate and liquid-crystal plane, such as, for example, IPS (in-plane switching) cells. In particular, TN, STN and IPS cells, especially TN, STN and IPS cells, are currently commercially interesting areas of application for the media according to the invention.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:

1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulator-metal).

MLC displays of this type are particularly suitable for TV applications (for example pocket televisions) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKI-GUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable lifetimes. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

Besides liquid-crystal displays which use backlighting, i.e. are operated transmissively and if desired transflectively, reflective liquid-crystal displays are also particularly interesting. These reflective liquid-crystal displays use the ambient light for information display. They thus consume significantly less energy than backlit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the trans-missive TFT-TN displays which are generally conventional, the use of liquid crystals of low birefringence (Δn) is necessary in order to achieve low optical retardation (d·Δn). This low optical retardation results in usually acceptably low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

For TV and video applications, displays having short response times are required. Such short response times can be achieved, in particular, if liquid-crystal media having low values for the viscosity, in particular the rotational viscosity $\gamma_1$, are used. However, diluting additives generally lower the clearing point and thus reduce the working-temperature range of the medium.

Thus, there continues to be a great demand for MLC displays having very high specific resistance at the same time as a large working-temperature range, short response times, even at low temperatures, and a low threshold voltage which do not exhibit these disadvantages or only do so to a lesser extent.

In the case of TN (Schadt-Helfrich) cells, media are desired which facilitate the following advantages in the cells:

extended nematic phase range (in particular down to low temperatures)

switchability at extremely low temperatures (outdoor use, automobiles, avionics)

increased resistance to UV radiation (longer life)

low threshold voltage.

The media available from the prior art do not enable these advantages to be achieved while simultaneously retaining the other parameters.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

In particular in the case of LC displays for TV and video applications (for example LCD TVs, monitors, PDAS, notebooks, games consoles), a significant reduction in the response times is desired. There is therefore a demand for compounds for LC media which facilitate a reduction in the response times without simultaneously impairing the other properties of the LC medium, such as, for example, the clearing point, the dielectric anisotropy $\Delta\varepsilon$ or the birefringence $\Delta n$. Low rotational viscosities, in particular, are desirable for this purpose.

The invention is based on the object of providing media, in particular for MLC, TN, STN or IPS displays of this type, which have the desired properties indicated above and do not exhibit the disadvantages mentioned above or only do so to a lesser extent. In particular, the LC media should have fast response times and low rotational viscosities at the same time as high dielectric anisotropy. In addition, the LC media should have a high clearing point, a broad nematic phase range and a low threshold voltage.

It has now been found that this and other objects can be achieved if LC media comprising one or more compounds of the formula I containing an —O—CH=CF$_2$— end group are used. The compounds of the formula I result in LC media having the desired properties indicated above.

The invention relates to a liquid-crystalline medium, characterised in that it comprises one or more compounds of the formula I

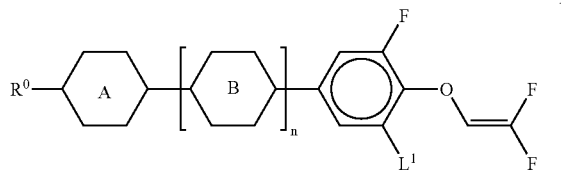

in which

R$^0$ denotes an alkyl or alkoxy radical having 1 to 15 C atoms, where, in addition, one or more CH$_2$ groups in these radicals may each be replaced, independently of one another, by —C≡C—, —CF$_2$O—, —CH=CH—,

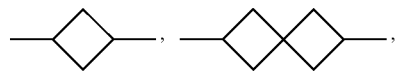

—O—, —CO—O— or —O—CO— in such a way that O atoms are not linked directly to one another, and in which, in addition, one or more H atoms may be replaced by halogen, L$^1$ denotes H or F,
n denotes 1 or 2, and

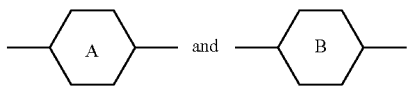

each, independently of one another, denote

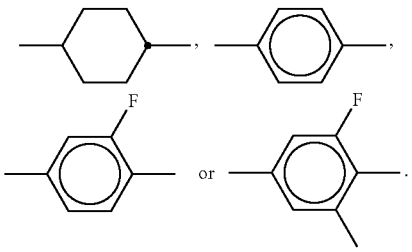

The invention furthermore relates to the use of the LC media according to the invention in electronic and electro-optical devices, in particular in LC displays.

The invention furthermore relates to an electro-optical display, in particular an LC display, containing an LC medium according to the invention, in particular an MLC, TN, STN or IPS display.

Surprisingly, it has been found that LC media comprising one or more compounds of the formula I simultaneously have low rotational viscosity $\gamma_1$ and high positive dielectric anisotropy, as well as fast response times, high elastic constants K11, K22 and K33, a low threshold voltage, a high clearing point and a broad nematic phase range.

The compounds of the formula I have a broad range of applications. Depending on the choice of substituents, they can serve as base materials of which liquid-crystalline media are predominantly composed; however, liquid-crystalline base materials from other classes of compound can also be added to the compounds of the formula I in order, for example, to modify the dielectric and/or optical anisotropy of a dielectric of this type and/or to optimise its threshold voltage and/or its viscosity.

Particular preference is given to compounds of the formula I in which $L^1$ denotes F.

Preference is furthermore given to compounds of the formula I in which $R^0$ denotes straight-chain alkyl or alkoxy having 1 to 8 C atoms or straight-chain alkenyl or alkenyloxy having 2 to 7 C atoms.

Preference is furthermore given to compounds of the formula I in which, if A does not denote a cyclohexyl ring, B likewise does not denote a cyclohexyl ring, and/or compounds of the formula I in which

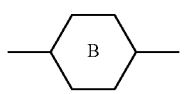

denotes

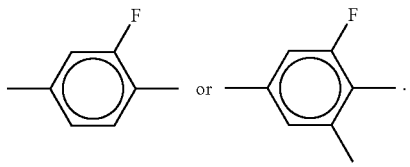

Further preferred compounds of the formula I are those selected from the following formulae:

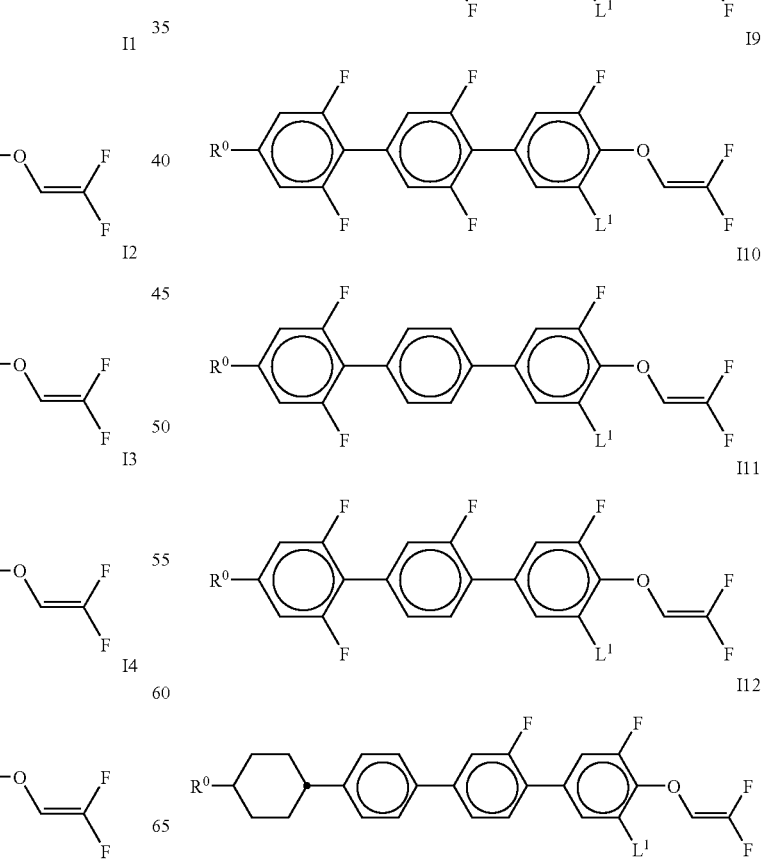

US 7,807,236 B2

-continued

-continued

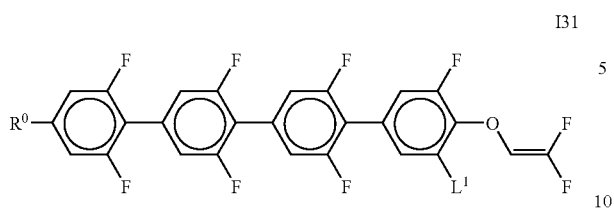
I31 in which R⁰ and L¹ have the meaning indicated above, L¹ preferably denotes F and R⁰ preferably denotes straight-chain alkyl having 1, 2, 3, 4, 5, 6, 7 or 8 C atoms.

If R⁰ in the formulae above and below denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyl-oxy, decyloxy, undecyloxy, dodecyloxy, tridecyloxy or tetradecyloxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If R⁰ denotes an alkyl radical in which one CH₂ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl. These radicals may also be mono- or polyhalogenated.

If R⁰ denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

The invention furthermore relates to compounds of the formula I in which R⁰, L¹, n, A and B have the meaning indicated above, and in which at least one of the rings

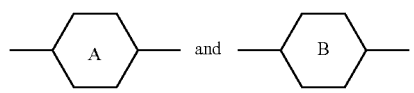

denotes

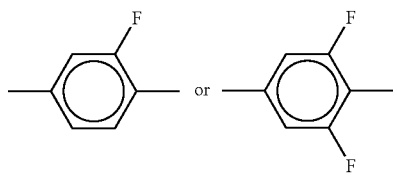

and/or n is 2.

Particular preference is given to compounds in which

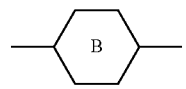

denotes

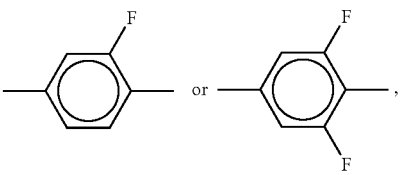

in particular those in which L¹ simultaneously denotes F.

Preference is furthermore given to compounds in which n is 2.

Preference is furthermore given to compounds of the sub-formulae I3-I31.

The invention furthermore relates to processes for the preparation of compounds of the formula I, to the use thereof in electronic and electro-optical devices, in particular in LC displays, and to LC displays containing same.

In the pure state, the compounds of the formula I are colourless and form liquid-crystalline mesophases in a temperature range which is favourably located for electro-optical use. They are stable chemically, thermally and to light.

The compounds of the formula I can be prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants known per se which are not mentioned here in greater detail. The synthesis of compounds of the formula I in which the rings A and B denote phenyl or cyclohexyl is described, for example, in WO 1992/21734 A1. Compounds of the formula I containing fluorinated phenyl rings A and B can be prepared analogously to the processes known from the literature, and in particular in accordance with reaction scheme 1 below or analogously thereto (in which X denotes H or F and R denotes R⁰ or R⁰-A- in accordance with formula I).

Scheme 1

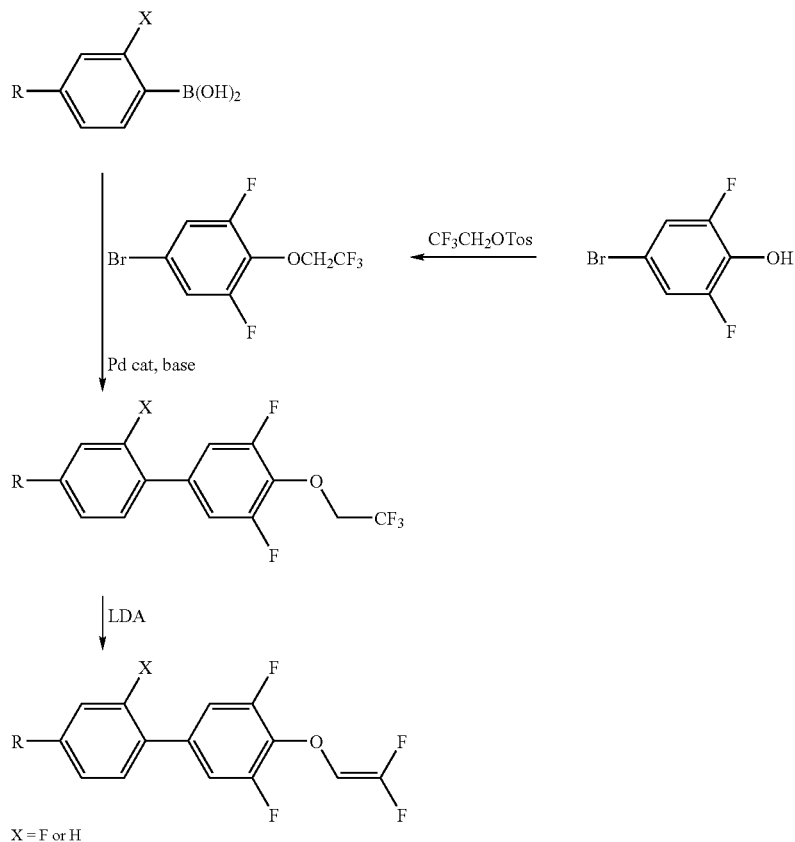

Particularly preferred embodiments of LC media according to the invention are indicated below:

The medium additionally comprises one or more compounds of the formulae II and/or III:

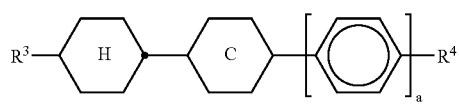

in which
ring C denotes 1,4-phenylene or trans-1,4-cyclohexylene,
a is 0 or 1, and
$R^3$ denotes alkenyl having 2 to 9 C atoms,
and $R^4$ has one of the meanings indicated for $R^0$ in formula I and preferably denotes alkyl having 1 to 12 C atoms or alkenyl having 2 to 9 C atoms.

The compounds of the formula II are preferably selected from the following formulae:

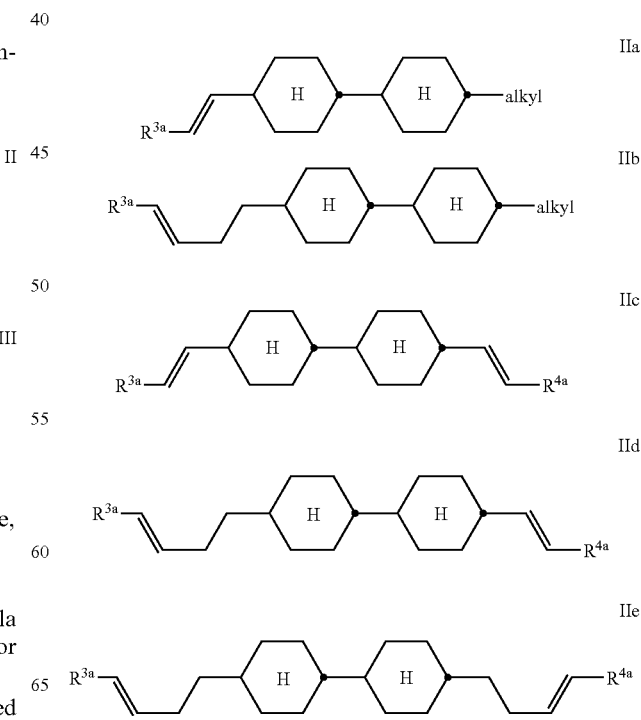

-continued

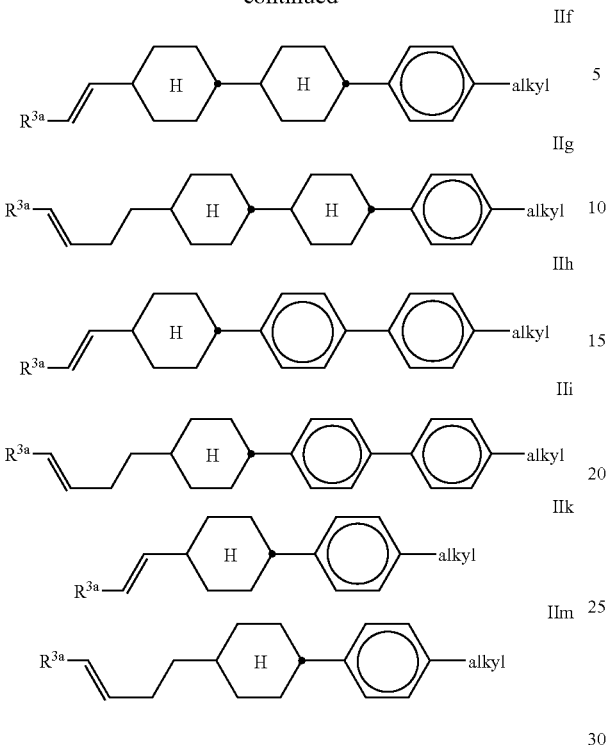

in which $R^{3a}$ and $R^{4a}$ each, independently of one another, denote H, $CH_3$, $C_2H_5$ or $C_3H_7$, and "alkyl" denotes a straight-chain alkyl group having 1 to 8 C atoms. Particular preference is given to compounds of the formulae IIa and IIf in particular in which $R^{3a}$ denotes H or $CH_3$, and compounds of the formula IIc, in particular in which $R^{3a}$ and $R^{4a}$ denote H, $CH_3$ or $C_2H_5$.

The compounds of the formula III are preferably selected from the following formulae:

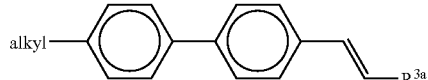

IIIa

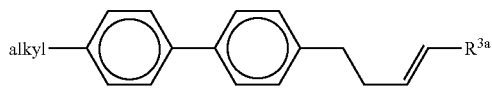

IIIb in which "alkyl" and $R^{3a}$ have the meaning indicated above and $R^{3a}$ preferably denotes H or $CH_3$. Particular preference is given to compounds of the formula IIIb;

The medium additionally comprises one or more compounds selected from the following formulae:

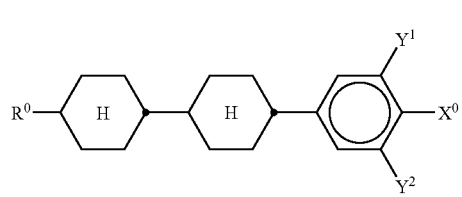

IV

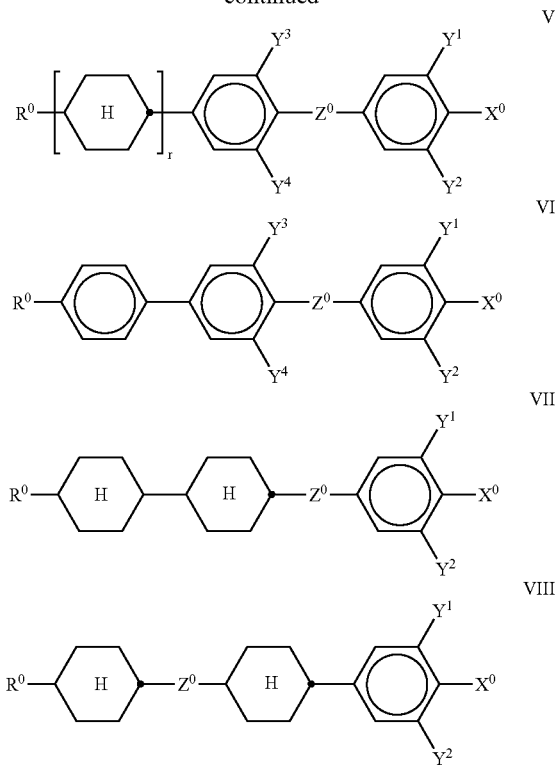

in which $R^0$ has the meaning indicated in formula I, $Y^{1-4}$ each, independently of one another, denote H or F, $X^0$ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms, $Z^0$ denotes $-C_2H_4-$, $-(CH_2)_4-$, $-CH=CH-$, $-CF=CF-$, $-C_2F_4-$, $-CH_2CF_2-$, $-CF_2CH_2-$, $-CH_2O-$, $-OCH_2-$, $-COO-$, $-CF_2O-$ or $-OCF_2-$, in formulae V and VI also a single bond, and r denotes 0 or 1;

The compounds of the formula IV are preferably selected from the following formulae:

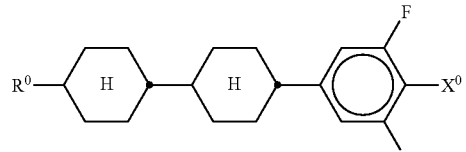

IVa

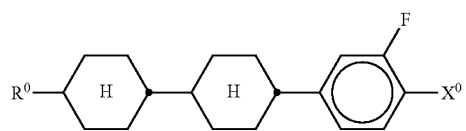

IVb

IVc in which R⁰ and X⁰ have the meaning indicated above. Preferably, R⁰ denotes alkyl having 1 to 8 C atoms and X⁰ denotes F or OCF₃;

The medium comprises one or more compounds of the formula V in which Z⁰ denotes a single bond, particularly preferably those selected from the following formulae:

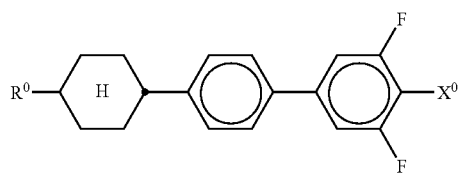

V1a

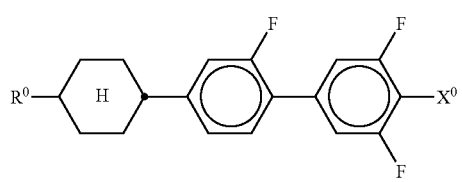

V1b

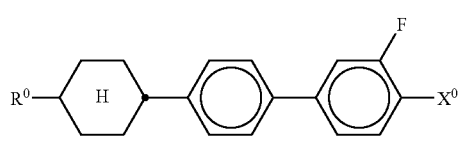

V1c

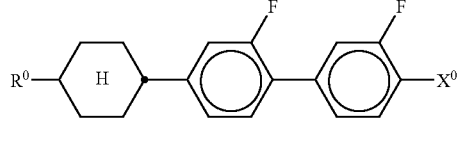

V1d

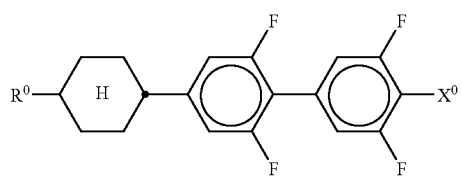

V1e

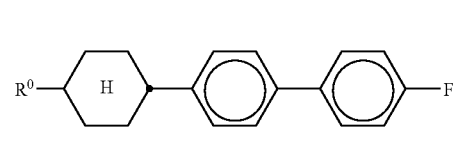

V1f

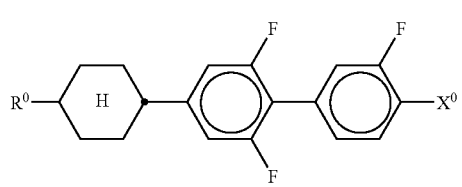

V1g in which R⁰ and X⁰ have the meaning indicated above. Preferably, R⁰ denotes alkyl having 1 to 8 C atoms and X⁰ denotes F;

The medium comprises one or more compounds of the formula V in which Z⁰ denotes —COO—, particularly preferably those selected from the following formulae:

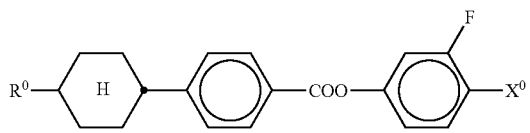

V2a

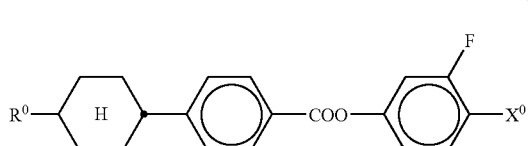

V2b

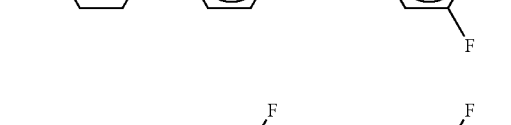

V2c

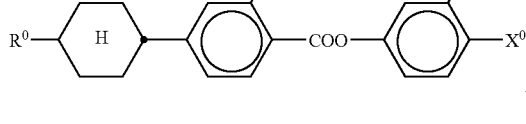

V2d

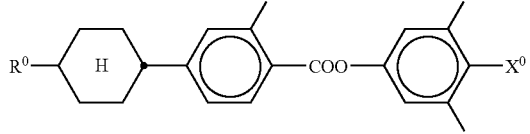

V2e

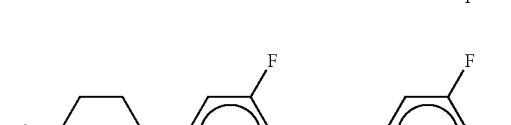

V2f

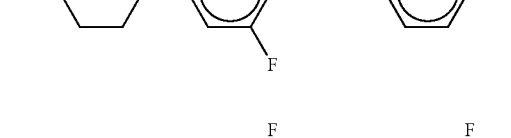

in which R⁰ and X⁰ have the meaning indicated above. Preferably, R⁰ denotes alkyl having 1 to 8 C atoms and X⁰ denotes F;

The medium comprises one or more compounds of the formula VI-1

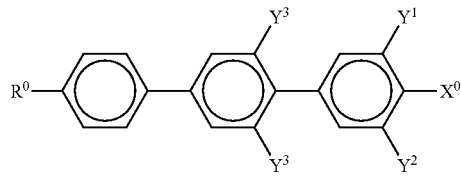

VI-1 particularly preferably those selected from the following formulae:

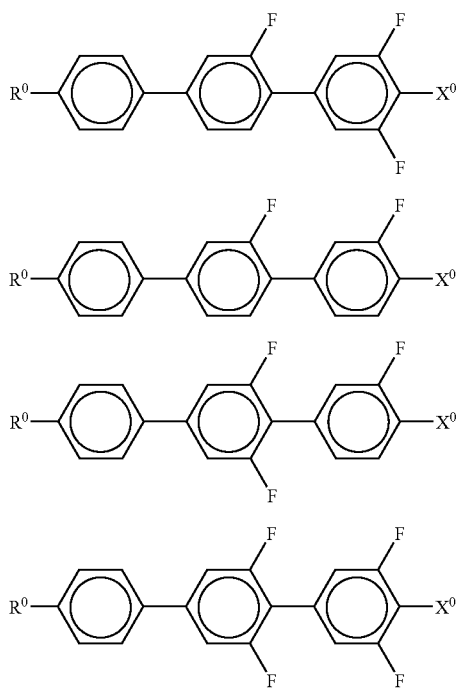

VI-1a
VI-1b
VI-1c
VI-1d in which $R^0$ and $X^0$ have the meaning indicated above. Preferably, $R^0$ denotes alkyl having 1 to 8 C atoms and $X^0$ denotes F;

The medium comprises one or more compounds of the formula VI-2

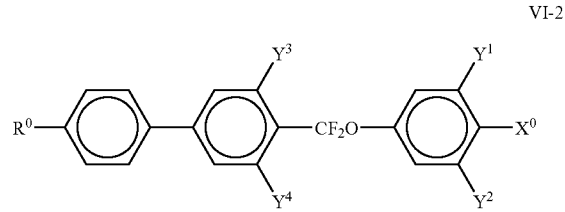

VI-2 particularly preferably those selected from the following formulae:

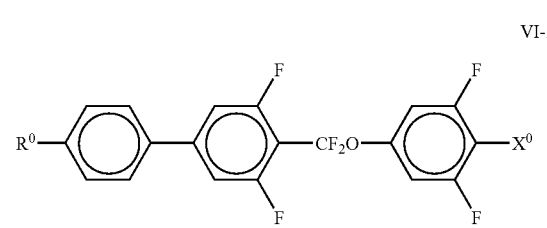

VI-2a

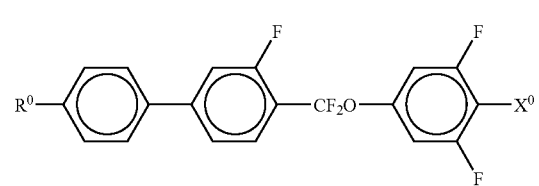

VI-2b

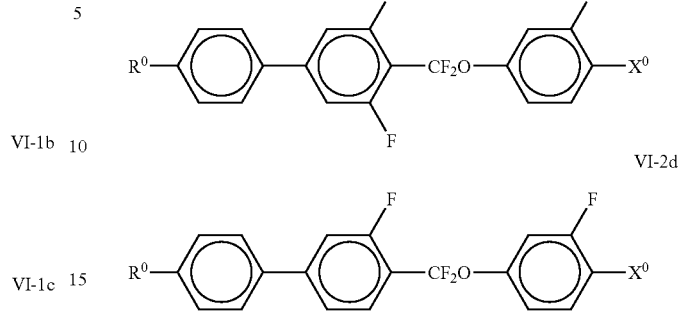

VI-2c

VI-2d in which $R^0$ and $X^0$ have the meaning indicated above. Preferably, $R^0$ denotes alkyl having 1 to 8 C atoms and $X^0$ denotes F or $OCF_3$;

The medium comprises one or more compounds of the formula VII in which $Z^0$ denotes —$CF_2O$—, particularly preferably those selected from the following formulae:

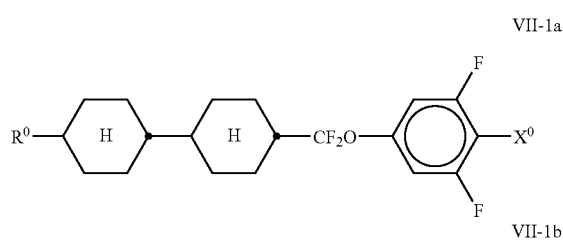

VII-1a

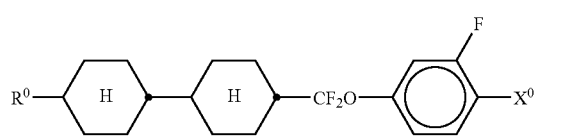

VII-1b in which $R^0$ and $X^0$ have the meaning indicated above. Preferably, $R^0$ denotes alkyl having 1 to 8 C atoms and $X^0$ denotes F;

The medium comprises one or more compounds of the formula VII in which $Z^0$ denotes —COO—, particularly preferably those selected from the following formulae:

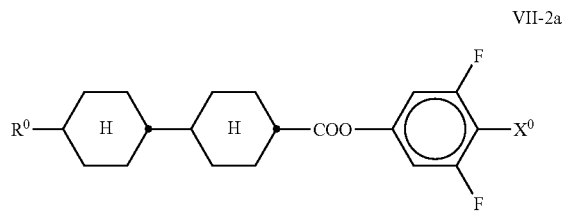

VII-2a

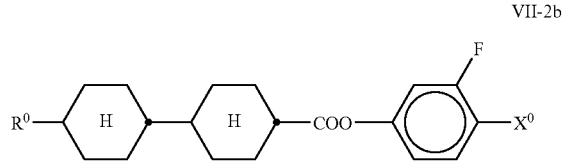

VII-2b in which $R^0$ and $X^0$ have the meaning indicated above. Preferably, $R^0$ denotes alkyl having 1 to 8 C atoms and $X^0$ denotes F;

The medium additionally comprises one or more compounds of the following formula:

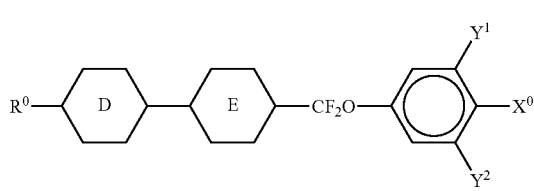

IX in which $R^0$, $X^0$, $Y^1$ and $Y^2$ have the meaning indicated above, and

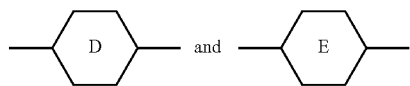

each, independently of one another, denote

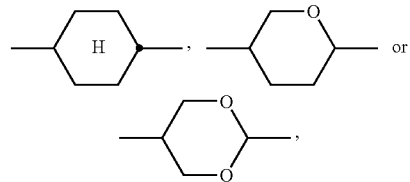

where the rings D and E do not both simultaneously denote cyclohexylene;

The compounds of the formula IX are preferably selected from the following formulae:

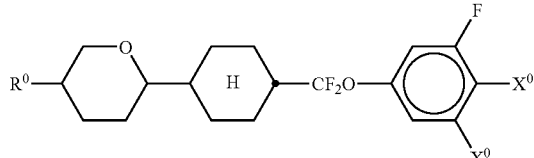

IXa

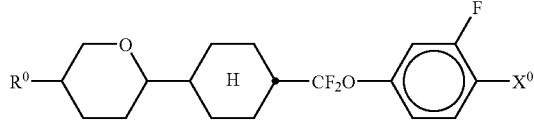

IXb

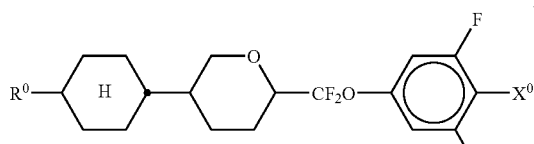

IXc

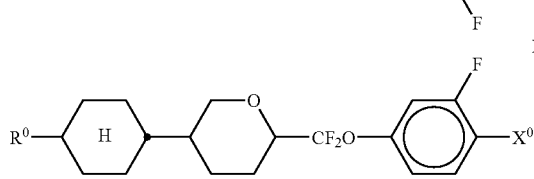

IXd

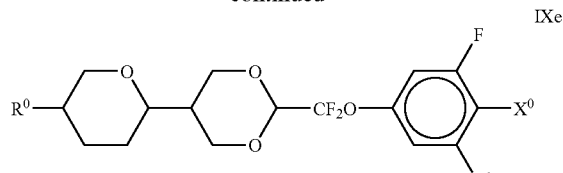

IXe

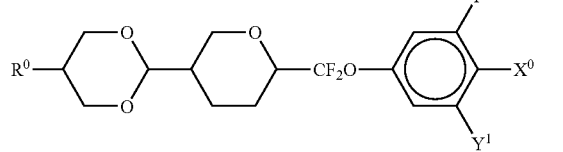

IXf

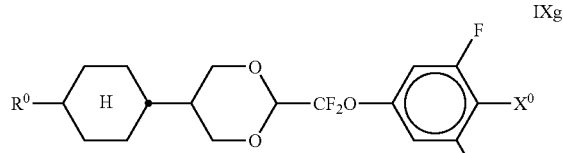

IXg

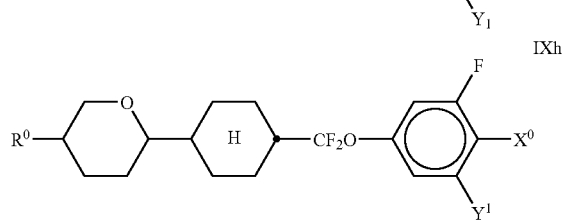

IXh in which $R^0$, $Y^1$ and $X^0$ have the meaning indicated above. Preferably, $R^0$ denotes alkyl having 1 to 8 C atoms and $X^0$ denotes F. Particular preference is given to compounds of the formula IXa;

The medium additionally comprises one or more compounds selected from the following formulae:

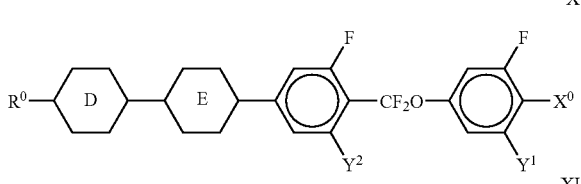

X

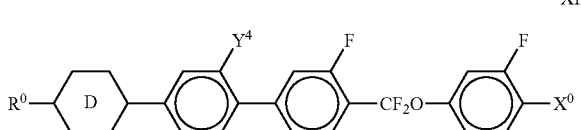

XI in which $R^0$, $X^0$ and $Y^{1-4}$ have the meaning indicated in formula I, and

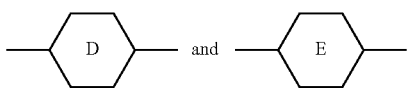

each, independently of one another, denote

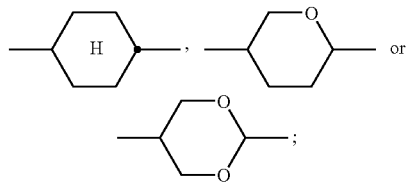

The compounds of the formulae X and XI are preferably selected from the following formulae:

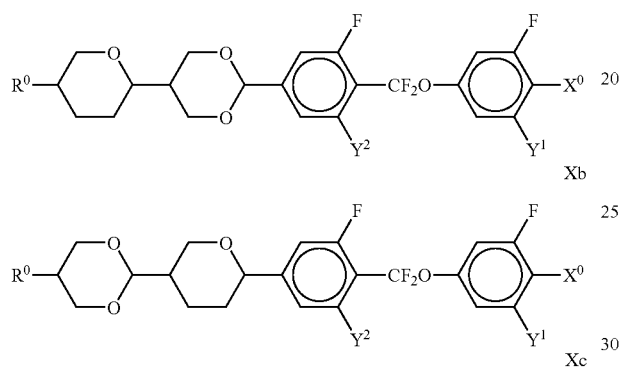

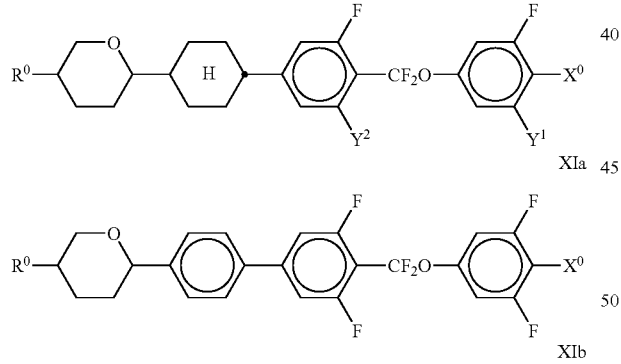

in which $R^0$ and $X^0$ have the meaning indicated above. Preferably, $R^0$ denotes alkyl having 1 to 8 C atoms and $X^0$ denotes F. Particularly preferred compounds are those in which $Y^1$ denotes F and $Y^2$ denotes H or F, preferably F;

The medium additionally comprises one or more compounds of the following formula:

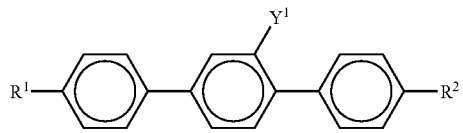

in which $R^1$ and $R^2$ each, independently of one another, denote n-alkyl, alkoxy, oxaalkyl, fluoroalkyl or alkenyl, each having up to 9 C atoms, and preferably each, independently of one another, denote alkyl having 1 to 8 C atoms, and $Y^1$ denotes H or F;

The medium additionally comprises one or more compounds selected from the following formulae:

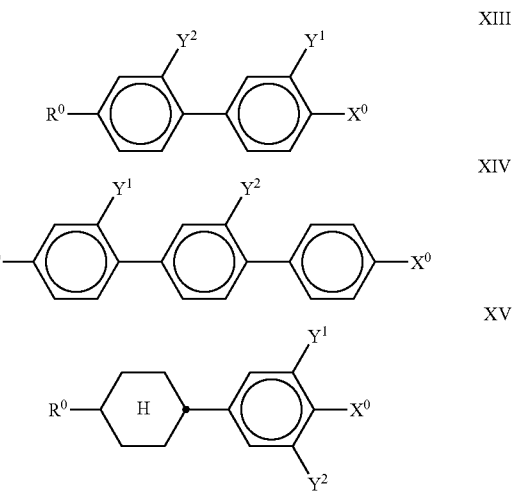

in which $R^0$, $X^0$, $Y^1$ and $Y^2$ have the meaning indicated above. Preferably, $R^0$ denotes alkyl having 1 to 8 C atoms and $X^0$ denotes F or Cl;

The compounds of the formulae XIII, XIV and XV are preferably selected from the following formulae:

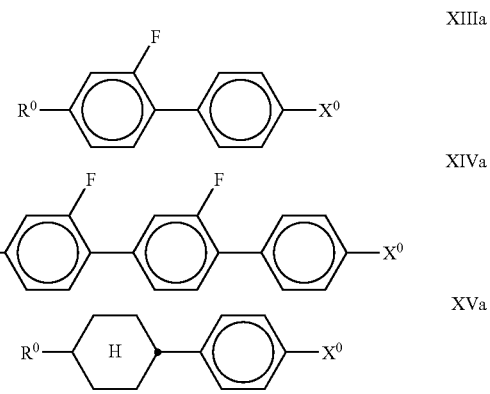

in which $R^0$ and $X^0$ have the meaning indicated above. Preferably, $R^0$ denotes alkyl having 1 to 8 C atoms and $X^0$ denotes Cl;

The medium additionally comprises one or more compounds of the following formula:

XVI

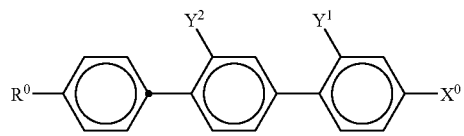

in which $Y^1$, $Y^2$, $R^0$ and $X^0$ have the meaning indicated above and $Y^1$ and $Y^2$ do not simultaneously denote H. Preferably, $R^0$ denotes alkyl having 1 to 8 C atoms and $X^0$ denotes F or Cl. Particular preference is given to compounds of the following formula:

XVIa

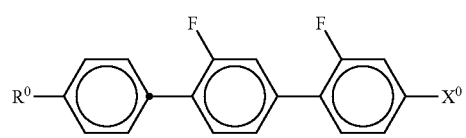

in which $R^0$ and $X^0$ have the meaning indicated above. Preferably, $R^0$ denotes alkyl having 1 to 8 C atoms and $X^0$ denotes F or Cl;

The medium additionally comprises one or more compounds of the following formula:

XVII

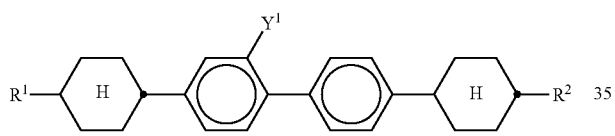

in which $Y^1$, $R^1$ and $R^2$ have the meaning indicated above. $R^1$ and $R^2$ preferably each, independently of one another, denote alkyl having 1 to 8 C atoms;

The medium additionally comprises one or more compounds of the following formula:

XVIII

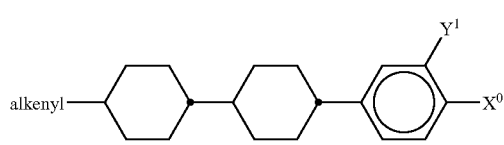

in which $X^0$ and $Y^1$ have the meaning indicated above and "alkenyl" denotes $C_{2-7}$-alkenyl. Particular preference is given to compounds of the following formula:

XVIIIa

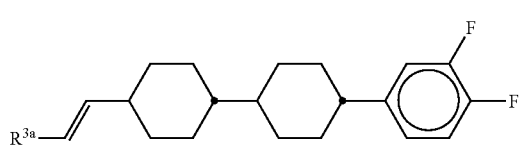

in which $R^{3a}$ has the meaning indicated above and preferably denotes H;

The medium additionally comprises one or more compounds selected from the following formulae:

XIX

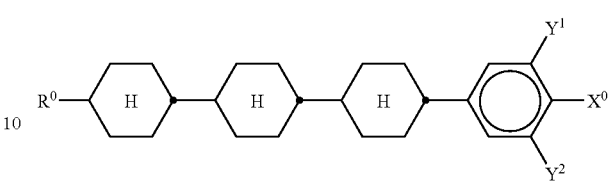

XX

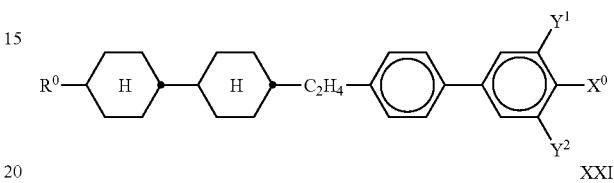

XXI

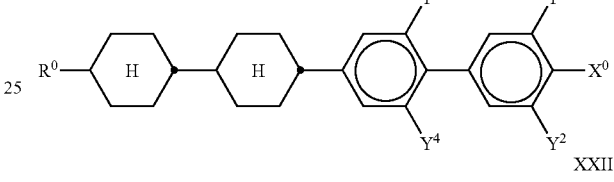

XXII

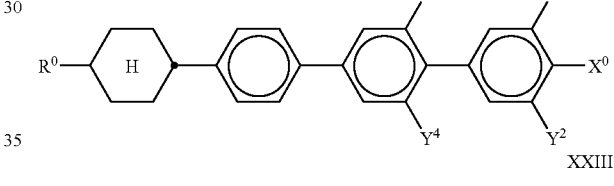

XXIII

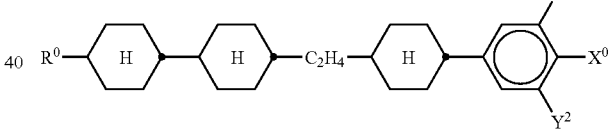

in which $Y^{1-4}$, $R^0$ and $X^0$ each, independently of one another, have one of the meanings indicated above. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 8 C atoms.

The compounds of the formula XXI are preferably selected from the following formula:

XXIa

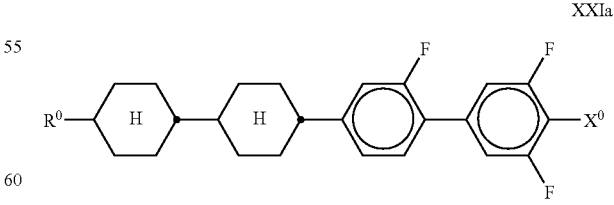

in which $R^0$ and $X^0$ have the meaning indicated above. Preferably, $R^0$ denotes alkyl having 1 to 8 C atoms and $X^0$ denotes F or $OCF_3$.

The compounds of the formula XXII are preferably selected from the following formula:

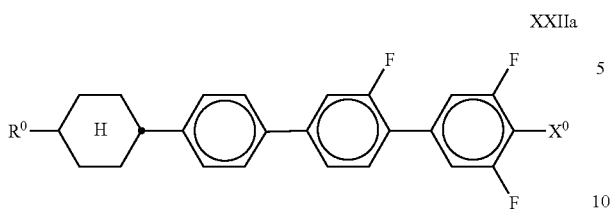
XXIIa in which R⁰ and X⁰ have the meaning indicated above. Preferably, R⁰ denotes alkyl having 1 to 8 C atoms and X⁰ denotes F or OCF₃.

The medium additionally comprises one or more compounds selected from the following formulae:

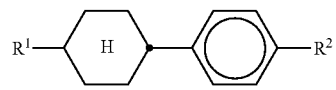
XXIV

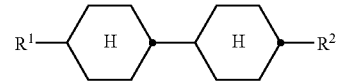
XXV

XXVI in which $R^1$ and $R^2$ have the meaning indicated above and preferably denote alkyl or alkoxy having 1 to 8 C atoms;

The medium additionally comprises one or more compounds of the following formula:

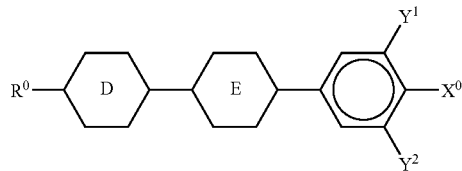
XXVII in which D, E, R⁰, X⁰, Y¹, and Y² have the meaning indicated above, where D and E do not simultaneously denote cyclohexylene;

The compounds of the formula XXVII are preferably selected from the following formulae:

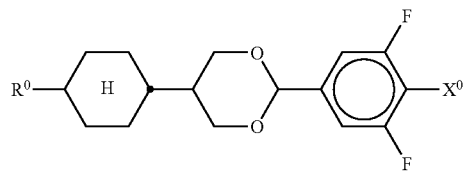
XXVIIa

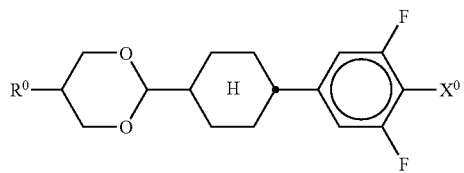
XXVIIb in which R⁰ and X⁰ have the meanings indicated above. Preferably, R⁰ denotes alkyl having 1 to 8 C atoms and X⁰ denotes F;

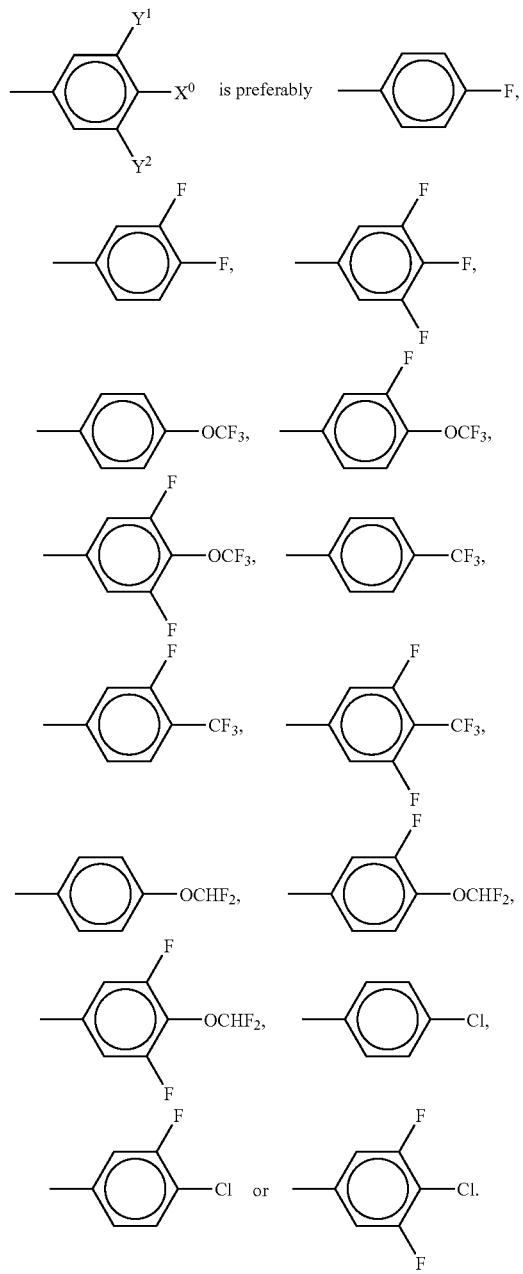

R⁰ is straight-chain alkyl or alkenyl having 2 to 7 C atoms; X⁰ is F;

The medium comprises one, two, three, four or five compounds of the formula I;

The medium comprises compounds selected from the formulae I, II III, V, VI-2, VII, XI, XII, XIV, XV, XXI, XXII and XXVII;

The medium comprises 1-55% by weight, preferably 3-45% by weight, of compounds of the formula I;

The proportion of compounds of the formulae II-XXVII in the mixture as a whole is 20 to 99% by weight;

The medium comprises 5-50% by weight, particularly preferably 10-40% by weight, of compounds of the formulae II and/or III;

The medium comprises 5-30% by weight, particularly preferably 8-25% by weight, of compounds of the formula VI-2;

The medium comprises 5-40% by weight, particularly preferably 8-30% by weight, of compounds of the formula VII;

The medium comprises 3-35% by weight, particularly preferably 5-20% by weight, of compounds of the formula XI;

The medium comprises 2-25% by weight, particularly preferably 3-15% by weight, of compounds of the formula XIV;

The medium comprises 1-15% by weight, particularly preferably 2-10% by weight, of compounds of the formula XV;

The medium comprises 3-30% by weight, particularly preferably 6-20% by weight, of compounds of the formula XXI and/or XXII;

The medium comprises 1-25% by weight, particularly preferably 2-20% by weight, of compounds of the formula XXVII.

It has been found that even a relatively small proportion of compounds of the formula I mixed with conventional liquid-crystal materials, but in particular with one or more compounds of the formulae II to XXVII, results in a significant increase in the light stability and in low birefringence values, with broad nematic phases with low smectic-nematic transition temperatures being observed at the same time, improving the shelf life. At the same time, the mixtures exhibit very low threshold voltages and very good values for the VHR (voltage holding ratio) on exposure to UV.

The term "alkyl" or "alkyl*" encompasses straight-chain and branched alkyl groups having 1-7 carbon atoms, in particular the straight-chain groups methyl, ethyl, propyl, butyl, pentyl, hexyl and heptyl. Groups having 1-6 carbon atoms are generally preferred.

The term "alkenyl" encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

In the formulae above and below, $X^0$ is preferably F, Cl or mono- or polyfluorinated alkyl or alkoxy having 1, 2 or 3 C atoms or mono- or polyfluorinated alkenyl having 2 or 3 C atoms. $X^0$ is particularly preferably F, Cl, $CF_3$, $CHF_2$, $OCF_3$, $OCHF_2$, $OCFHCF_3$, $OCFHCHF_2$, $OCFHCH_2F$, $OCF_2CH_3$, $OCF_2CHF_2$, $OCF_2CH_2F$, $OCF_2CF_2CHF_2$, $OCF_2CF_2CH_2F$, $OCFHCF_2CF_3$, $OCFHCF_2CHF_2$, $OCF_2CF_2CF_3$, $OCF_2CF_2CClF_2$, $OCClFCF_2CF_3$ or $CH=CF_2$, very particularly preferably F, Cl or $OCF_3$.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}$/$k_{11}$ compared with alkyl and alkoxy radicals. The mixtures according to the invention are distinguished, in particular, by high $K_1$ values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the mixtures according to the invention is not crucial. The mixtures can therefore comprise one or more further components for the purposes of optimisation of various properties. However, the observed effect on the desired improvement in the properties of the mixture is generally greater, the higher the total concentration of compounds of the above-mentioned formulae.

In a particularly preferred embodiment, the media according to the invention comprise compounds of the formulae IV to VIII in which $X^0$ denotes F, $OCF_3$, $OCHF_2$, $OCF=CF_2$ or $OCF_2$—$CF_2H$. A favourable synergistic action with the compounds of the formula I results in particularly advantageous properties. In particular, mixtures comprising compounds of the formulae I, V and VI are distinguished by their low threshold voltages.

The individual compounds of the above-mentioned formulae and the sub-formulae thereof which can be used in the media according to the invention are either known or can be prepared analogously to the known compounds.

The invention also relates to electro-optical displays, such as, for example, TN, STN, IPS or MLC displays, having two plane-parallel outer plates, which, together with a frame, form a cell, integrated non-linear elements for switching individual pixels on the outer plates, and a nematic liquid-crystal mixture having positive dielectric anisotropy and high specific resistance located in the cell, which contain media of this type, and to the use of these media for electro-optical purposes.

The liquid-crystal mixtures according to the invention enable a significant broadening of the available parameter latitude. The achievable combinations of clearing point, viscosity at low temperature, thermal and UV stability and high optical anisotropy are far superior to previous materials from the prior art.

The mixtures according to the invention are particularly suitable for mobile applications and high-Δn TFT applications, such as, for example, PDAs, notebooks, LCD TVs and monitors.

The liquid-crystal mixtures according to the invention preferably have a nematic phase down to −20° C. and preferably down to −30° C., particularly preferably down to −40° C., and preferably have a clearing point ≧60° C., particularly preferably ≧65° C., very particularly preferably ≧70° C.

The rotational viscosity $\gamma_1$ is preferably ≦150 mPa·s, particularly preferably ≦90 mPa·s. This enables MLC displays having fast response times to be achieved.

The dielectric anisotropy Δ∈ of the liquid-crystal mixtures according to the invention is preferably ≧+1.5, particularly preferably ≧+3. In addition, the mixtures are characterised by low operating voltages. The threshold voltage of the liquid-crystal mixtures according to the invention is preferably ≦2.0 V.

The birefringence Δn of the liquid-crystal mixtures according to the invention is preferably ≧0.07, particularly preferably ≧0.08.

The nematic phase range of the liquid-crystal mixtures according to the invention preferably has a width of at least 90°, in particular at least 100°. This range preferably extends at least from −25° to +70° C.

It goes without saying that, through a suitable choice of the components of the mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having a higher Δ∈ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR on UV exposure than analogous mixtures comprising cyano-phenylcyclohexanes of the formula

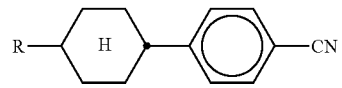

or esters of the formula

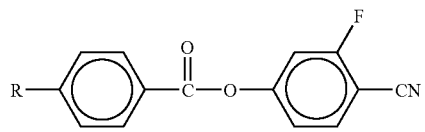

instead of the compounds of the formula I.

The light stability and UV stability of the mixtures according to the invention are considerably better, i.e. they exhibit a significantly smaller decrease in the HR on exposure to light or UV. Even low concentrations of the compounds (<10% by weight) of the formula I in the mixtures increase the HR by 6% or more compared with mixtures from the prior art.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se, for example by mixing one or more compounds of the formula I with one or more compounds of the formulae II-XXVII or with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV stabilisers, such as Tinuvin® from Ciba, antioxidants, free-radical scavengers, nanoparticles, etc. For example, 0-15% of pleochroic dyes or chiral dopants can be added. Suitable dopants and stabilisers are mentioned below in Tables C and D.

In the present application and in the examples below, the structures of the liquid-crystal compounds are indicated by means of acronyms, the trans-formation into chemical formulae taking place in accordance with Tables A and B below. All radicals $C_nH_{2n+1}$ and $C_mH_{2m+1}$ are straight-chain alkyl radicals having n and m C atoms respectively; n and m are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for R¹*, R²*, L¹*, L²*, L³* | R¹* | R²* | L¹* | L²* |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO·m | $OC_nH_{2n+1}$ | $C_mH_{2m+1}$ | H | H |
| n | $C_nH_{2n+1}$ | CN | H | H |
| nN·F | $C_nH_{2n+1}$ | CN | F | H |
| nN·F·F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF·F | $C_nH_{2n+1}$ | F | F | H |
| nF·F·F | $C_nH_{2n+1}$ | F | F | F |
| nOCF₃ | $C_nH_{2n+1}$ | OCF₃ | H | H |
| nOCF₃·F | $C_nH_{2n+1}$ | OCF₃ | F | H |
| n-Vm | $C_nH_{2n+1}$ | —CH=CH—$C_mH_{2m+1}$ | H | H |
| nV-m | $C_nH_{2n+1}$—CH=CH— | —CH=CH—$C_mH_{2m+1}$ | H | H |

Preferred mixture components are given in Tables A and B

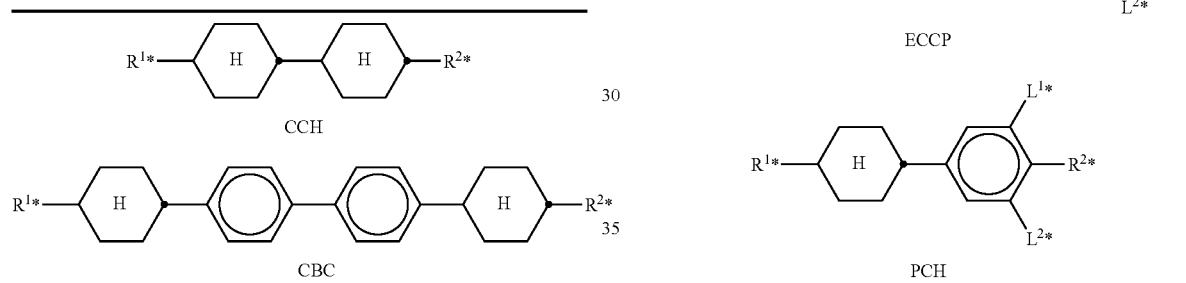

TABLE A

CCH

CBC

TABLE A-continued

BCH

CCP

ECCP

PCH

TABLE B

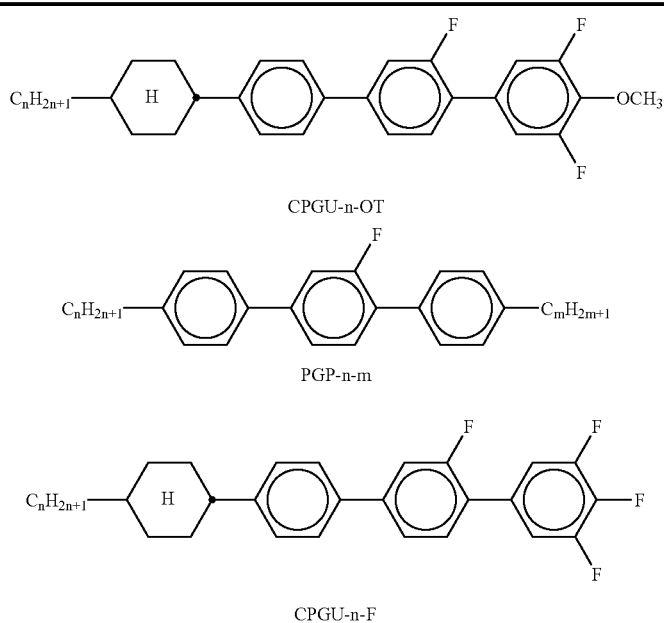

CPGU-n-OT

PGP-n-m

CPGU-n-F

TABLE B-continued
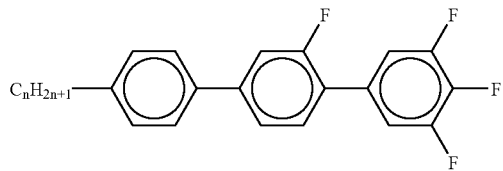
PGU-n-F
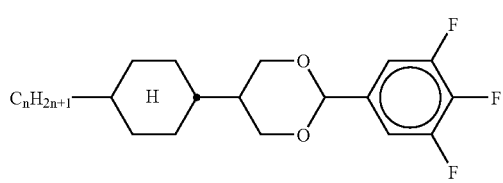
CDU-n-F
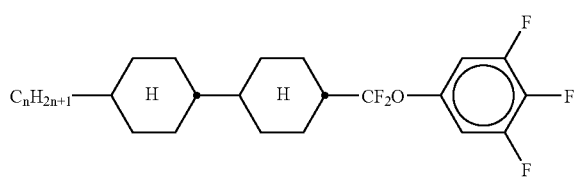
CCQU-n-F
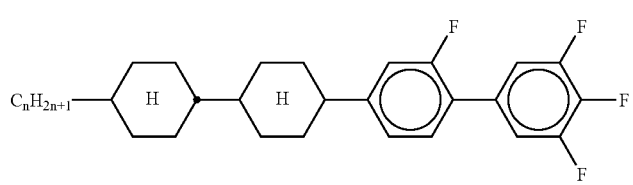
CCGU-n-F
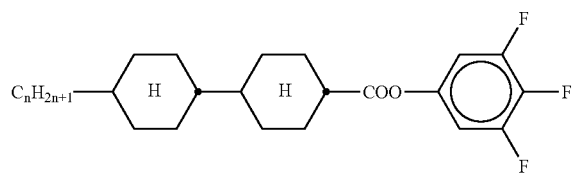
CCZU-n-F
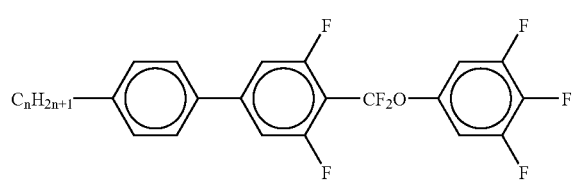
PUQU-n-F
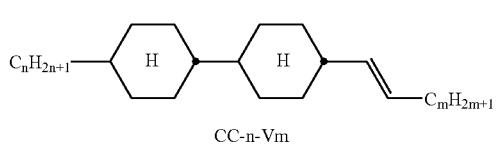
CC-n-Vm
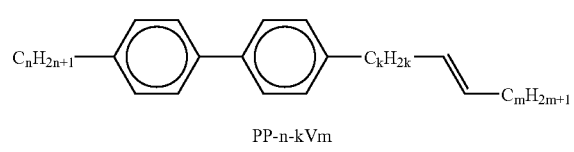
PP-n-kVm TABLE B-continued
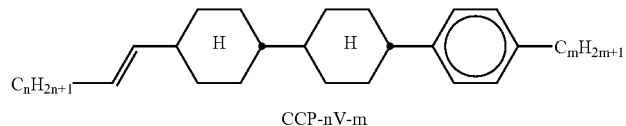
CCP-nV-m
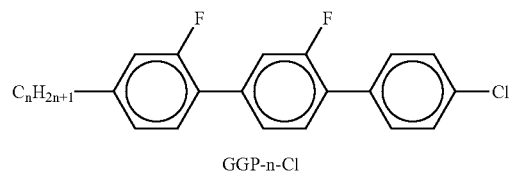
GGP-n-Cl
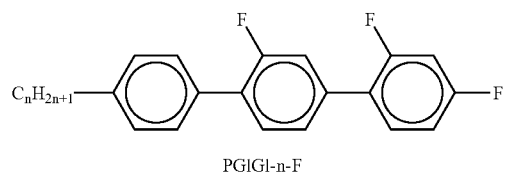
PGIGI-n-F
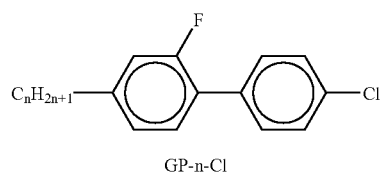
GP-n-Cl
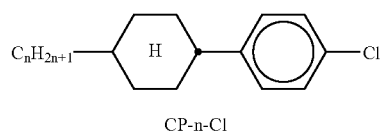
CP-n-Cl
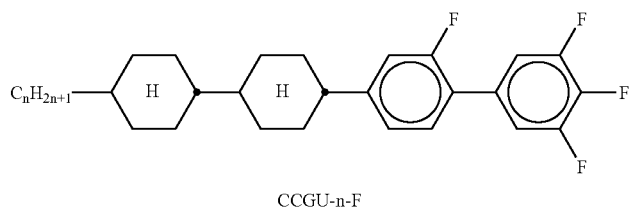
CCGU-n-F
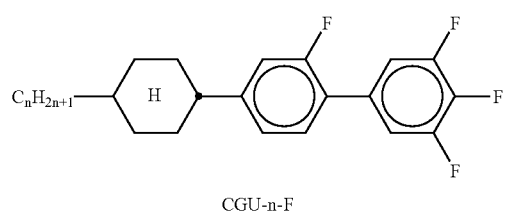
CGU-n-F
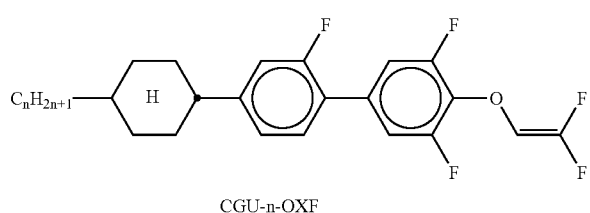
CGU-n-OXF TABLE B-continued
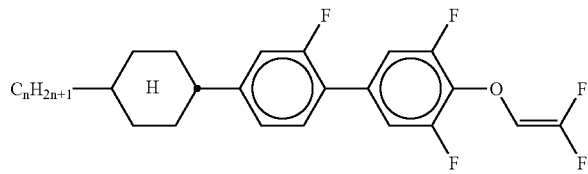
CGG-n-OXF
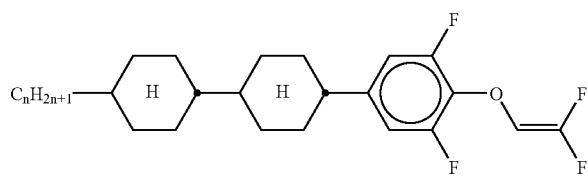
CCU-n-OXF
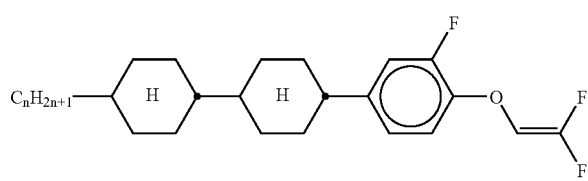
CCG-n-OXF
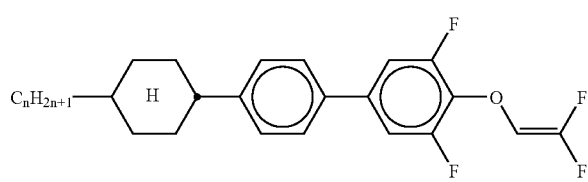
CPU-n-OXF
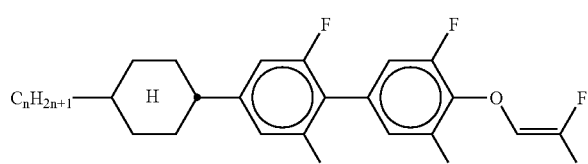
CUU-n-OXF
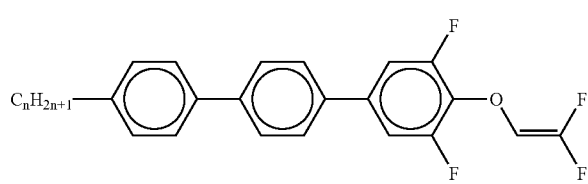
PPU-n-OXF
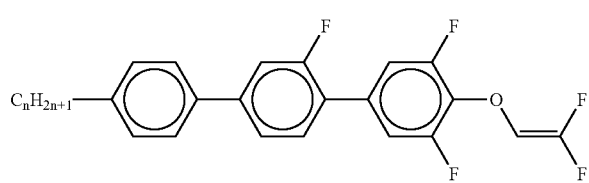
PGU-n-OXF TABLE B-continued
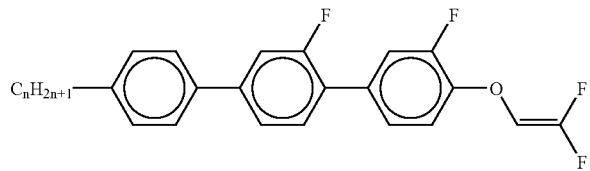
PGG-n-OXF
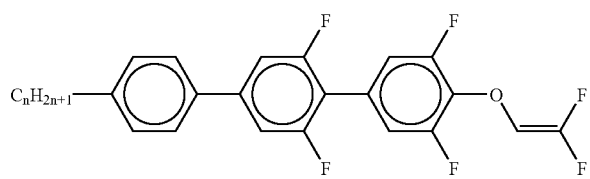
PUU-n-OXF
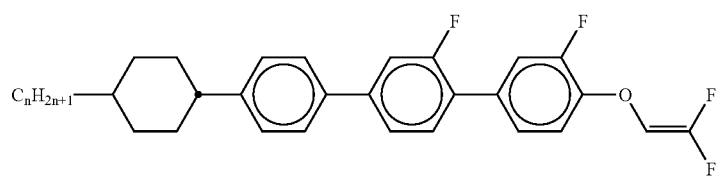
CPGU-n-OXF
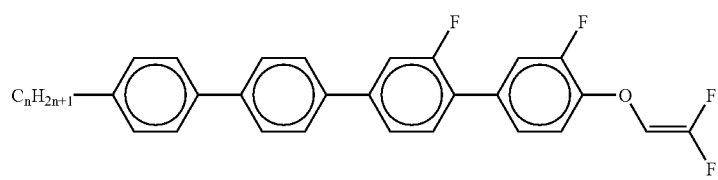
PPGU-n-OXF
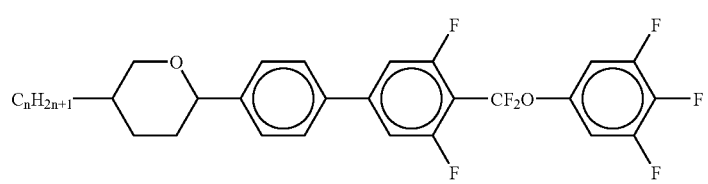
APUQU-n-F
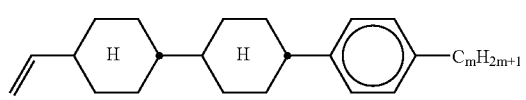
CCP-Vn-m Particular preference is given to liquid-crystalline mixtures which, besides the compounds of the formula I, comprise at least one, two, three, four or more compounds from Table B.

TABLE C

Table C indicates possible dopants which are generally added to the mixtures according to the invention. The mixtures preferably comprise 0-10% by weight, in particular 0.01-5% by weight and particularly preferably 0.01-3% by weight, of dopants.

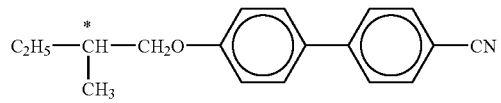

C 15

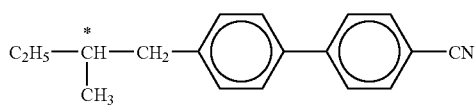

CB 15

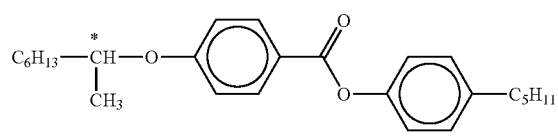

CM 21

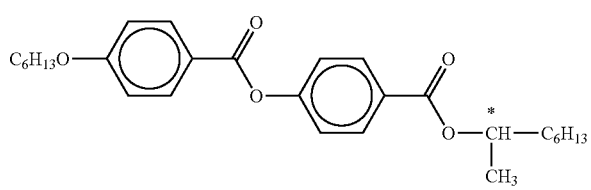

R/S-811

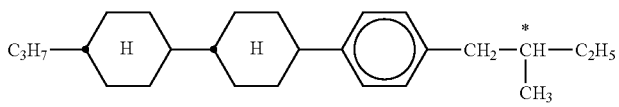

CM 44

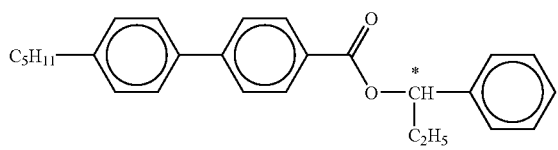

CM 45

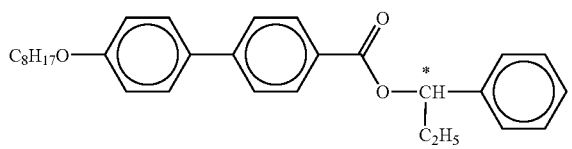

CM 47

TABLE C-continued
Table C indicates possible dopants which are generally added to the mixtures according to the invention. The mixtures preferably comprise 0-10% by weight, in particular 0.01-5% by weight and particularly preferably 0.01-3% by weight, of dopants.
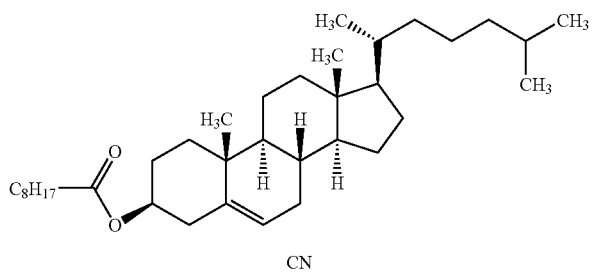
CN
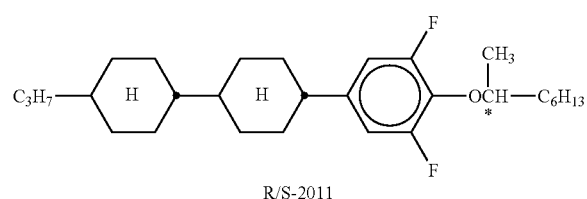
R/S-2011
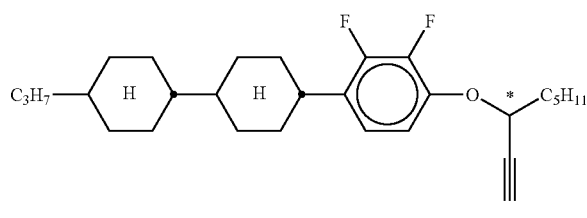
R/S-3011
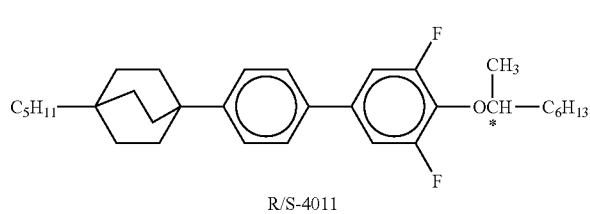
R/S-4011
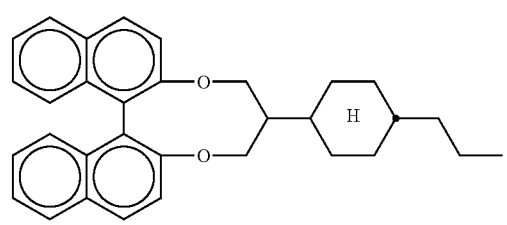
R/S 5011
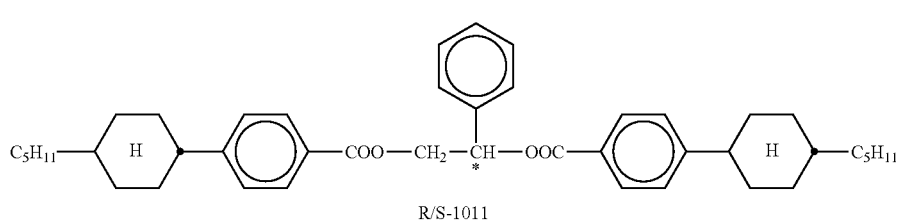
R/S-1011

TABLE D
Stabilisers which can be added, for example, to the mixtures according to the invention in amounts of 0-10% by weight are mentioned below.
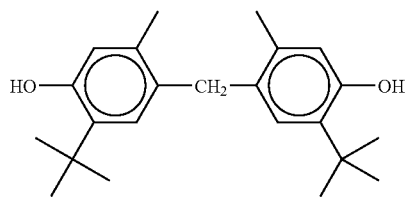
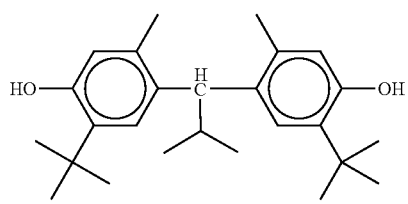
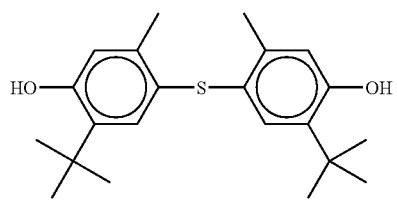
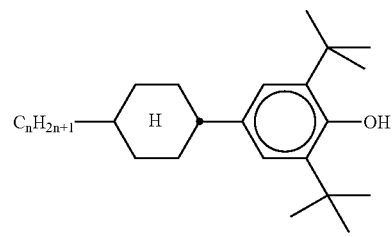
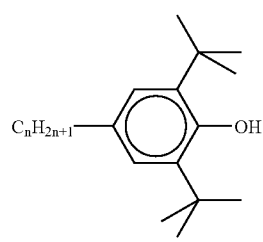
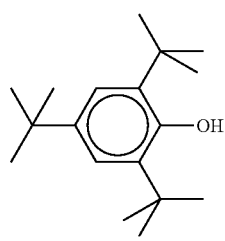

TABLE D-continued
Stabilisers which can be added, for example, to the mixtures according to the invention in amounts of 0-10% by weight are mentioned below.
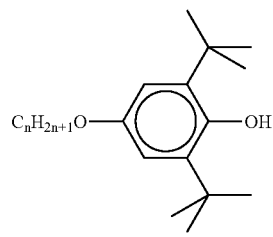
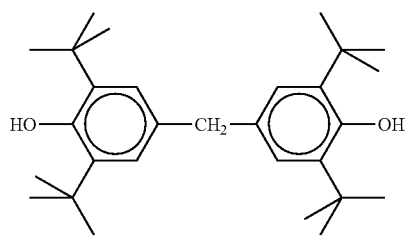
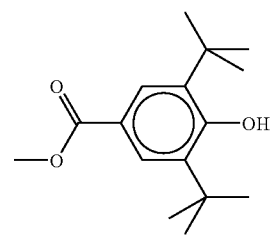
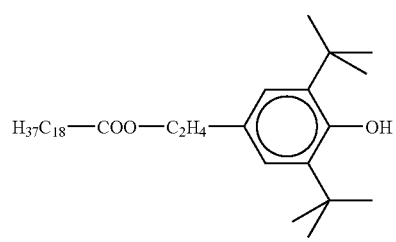
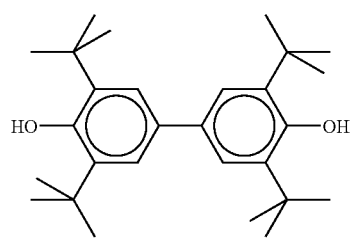

TABLE D-continued
Stabilisers which can be added, for example, to the mixtures according to the invention in amounts of 0-10% by weight are mentioned below.
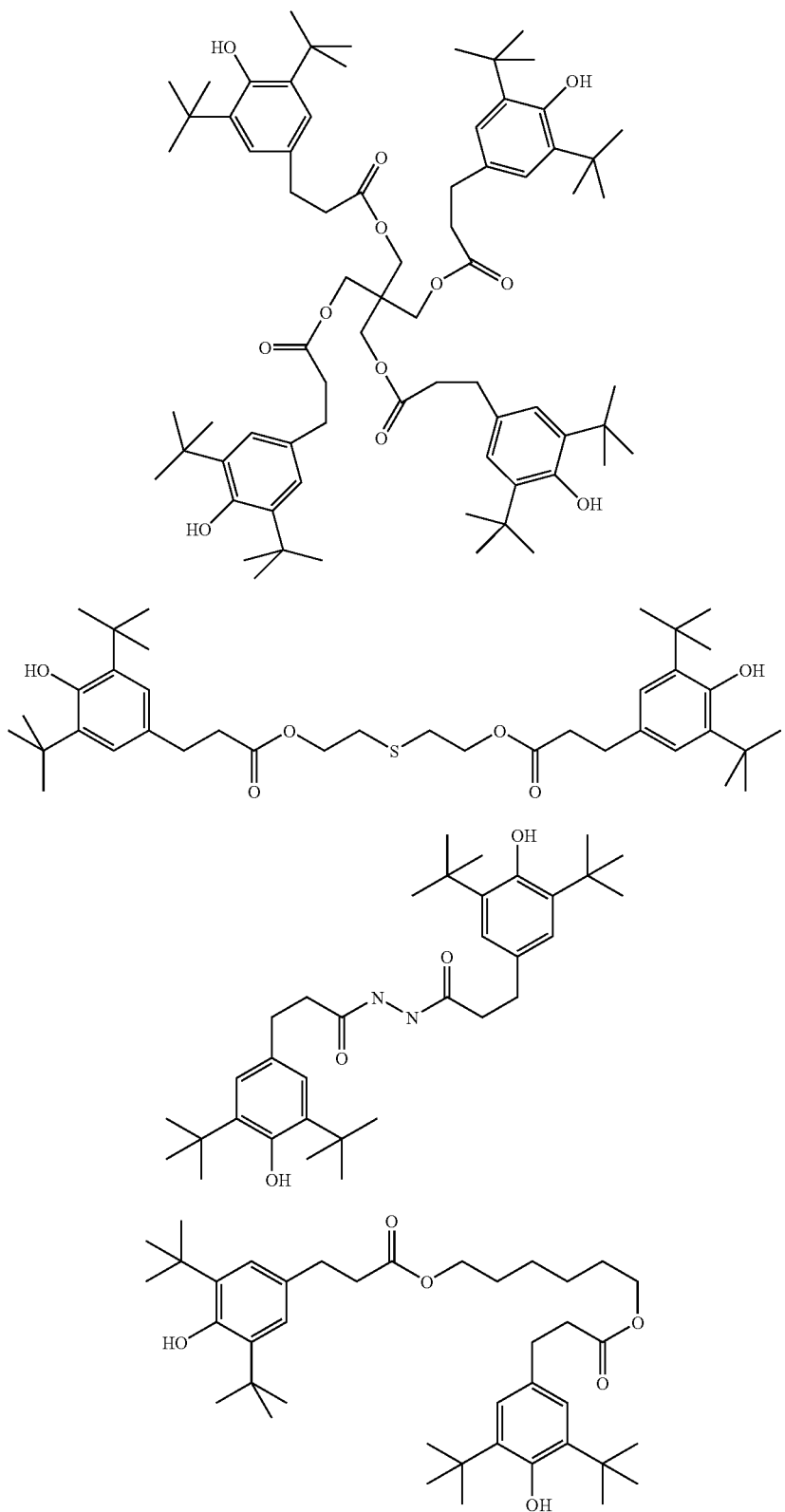

TABLE D-continued
Stabilisers which can be added, for example, to the mixtures according to the invention in amounts of 0-10% by weight are mentioned below.
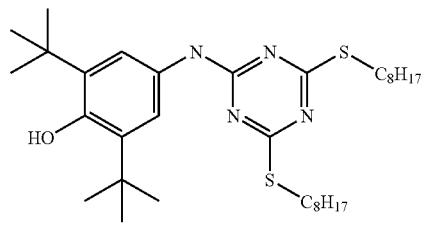
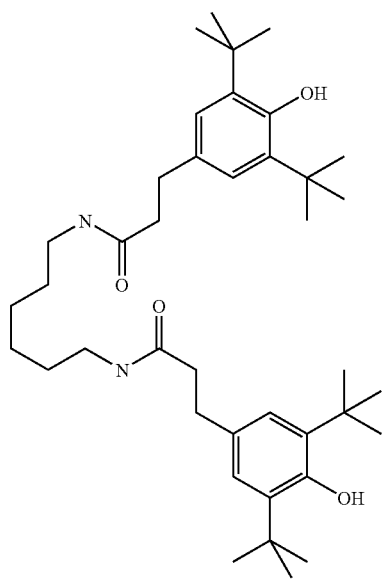
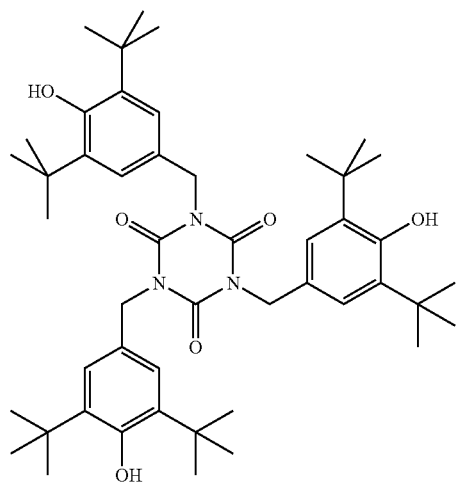

TABLE D-continued
Stabilisers which can be added, for example, to the mixtures according to the invention in amounts of 0-10% by weight are mentioned below.
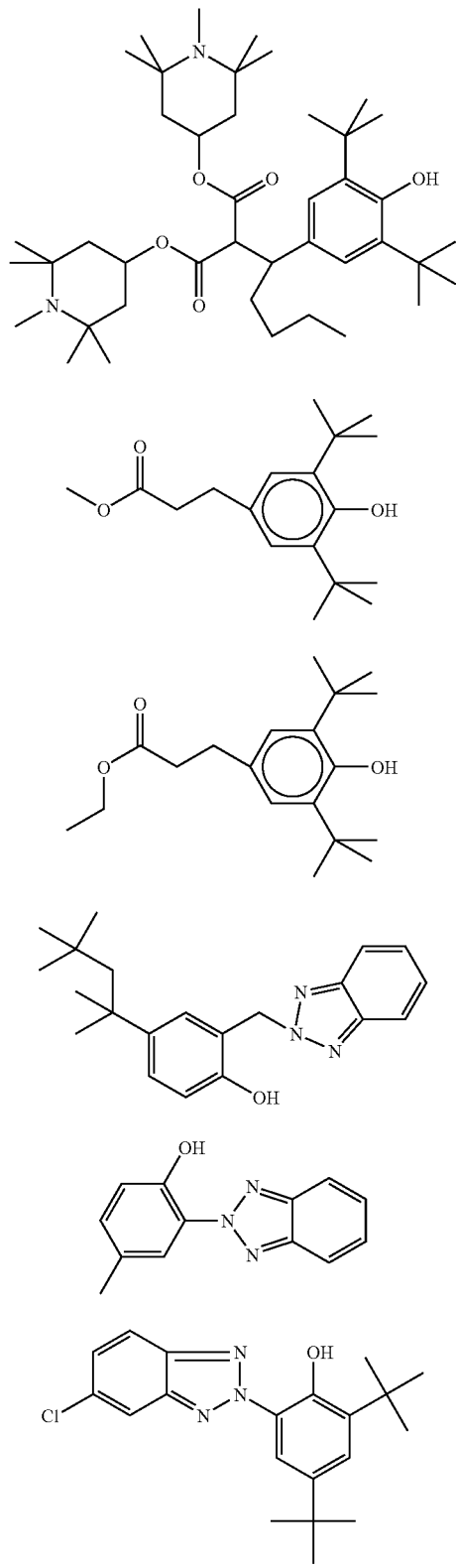

TABLE D-continued
Stabilisers which can be added, for example, to the mixtures according to the invention in amounts of 0-10% by weight are mentioned below.
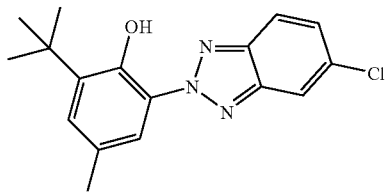
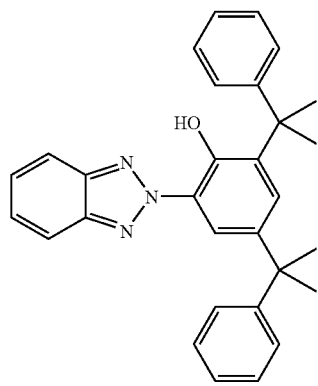
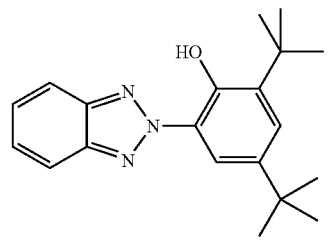
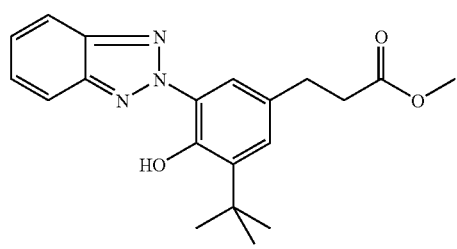
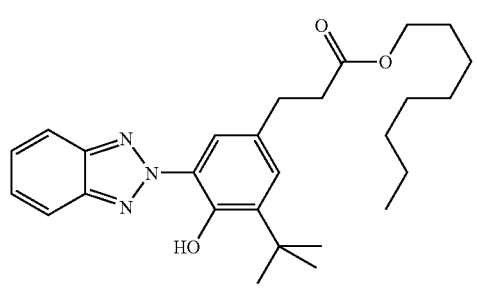

TABLE D-continued
Stabilisers which can be added, for example, to the mixtures according to the invention in amounts of 0-10% by weight are mentioned below.
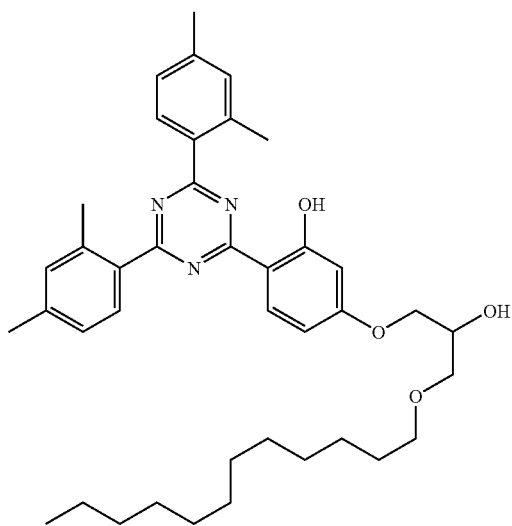
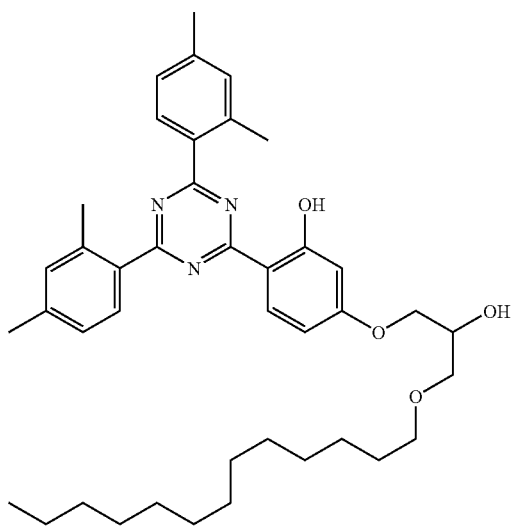
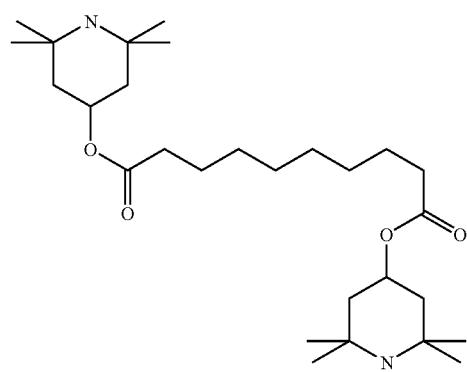

TABLE D-continued

Stabilisers which can be added, for example, to the mixtures
according to the invention in amounts of 0-10% by weight are mentioned below.

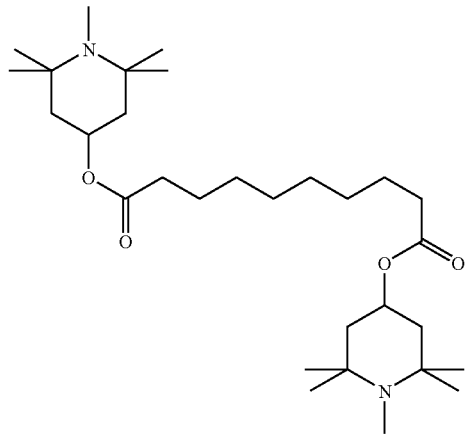

The entire disclosures of all applications, patents and publications, cited above and below, including German Patent Application No. 102007005317.9 filed Feb. 2, 2007, are hereby incorporated by reference.

EXAMPLES

The following examples are intended to explain the invention without limiting it.

Above and below, percentage data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, Δn denotes the optical anisotropy at 589 nm and 20° C.,
$\gamma_1$ denotes the rotational viscosity (mPa·s) at 20° C.,
$V_{10}$ denotes the voltage (V) for 10% transmission (viewing angle perpendicular to the plate surface), (threshold voltage),
Δ∈ denotes the dielectric anisotropy at 20° C. and 1 kHz (Δ∈=∈$_∥$-∈$_⊥$, where ∈$_∥$ denotes the dielectric constant parallel to the longitudinal axes of the molecules and ∈$_⊥$ denotes the dielectric constant perpendicular thereto).

The electro-optical data are measured in a TN cell at the 1st minimum (i.e. at a d·Δn value of 0.5 μm) at 20° C., unless expressly indicated otherwise. The optical data are measured at 20° C., unless expressly indicated otherwise. All physical properties are determined in accordance with "Merck Liquid Crystals, Physical Properties of Liquid Crystals", status November 1997, Merck KGaA, Germany, and apply for a temperature of 20° C., unless explicitly indicated otherwise.

Example 1

Compound (I) was prepared as described above.

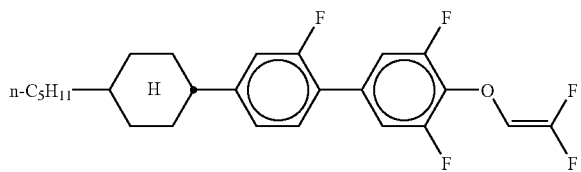

(1)

Phase behaviour: C 21 N 90.4 I, Δn=0.1510, Δ∈=+14.0
The following compounds were prepared analogously:
R-A$^1$-A$^2$-A$^3$-A$^4$-O—CH=CF$_2$

| No. | R | A$^1$ | A$^2$ | A$^3$ | A$^4$ | |
|-----|------|-----|-----|-----|-----|---|
| 2) | C$_2$H$_5$ | — | H (cyclohexyl) | difluorophenyl | trifluorophenyl | C 9 N 36.7 I<br>Δn = 0.1490,<br>Δ∈ = +15.4 |

-continued

| No. | R | A¹ | A² | A³ | A⁴ | |
|---|---|---|---|---|---|---|
| 3) | n-C₃H₇ | — | (Cy-H) | (Ph-2F) | (Ph-3,4,5-F) | C 36 N 80.7 I<br>Δn = 0.1550,<br>Δε = +14.4 |
| 4) | n-C₄H₉ | — | (Cy-H) | (Ph-2F) | (Ph-3,4,5-F) | |
| 5) | C₂H₅ | — | (Cy-H) | (Ph-2F) | (Ph-3-F) | C 24 N 41.2 I<br>Δn = 0.1480,<br>Δε = +8.6 |
| 6) | n-C₃H₇ | — | (Cy-H) | (Ph-2F) | (Ph-3-F) | C 35 N 90.1 I<br>Δn = 0.1540,<br>Δε = +8.6 |
| 7) | n-C₄H₉ | — | (Cy-H) | (Ph-2F) | (Ph-3-F) | |
| 8) | n-C₅H₁₁ | — | (Cy-H) | (Ph-2F) | (Ph-3-F) | C 48 N 96.6 I<br>Δn = 0.1470,<br>Δε = +8.3 |
| 9) | C₂H₅ | — | (Cy-H) | (Ph-2,6-F) | (Ph-3,5-F) | C 78 I<br>Δn = 0.1500,<br>Δε = +17.8 |
| 10) | n-C₃H₇ | — | (Cy-H) | (Ph-2,6-F) | (Ph-3,5-F) | C 87 N 91.5 I<br>Δn = 0.1440,<br>Δε = +19.0 |
| 11) | n-C₄H₉ | — | (Cy-H) | (Ph-2,6-F) | (Ph-3,5-F) | |

-continued
| No. | R | A¹ | A² | A³ | A⁴ | |
|---|---|---|---|---|---|---|
| 12) | n-C$_5$H$_{11}$ | — |  | 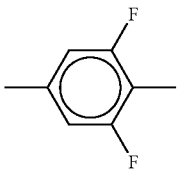 | 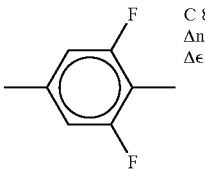 | C 86 I<br>Δn = 0.1420,<br>Δε = +16.0 |
| 13) | C$_2$H$_5$ | — |  | 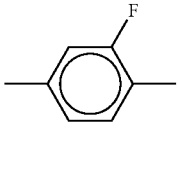 | 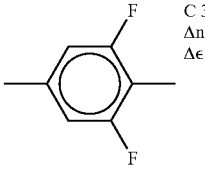 | C 32 S$_A$ 105 I<br>Δn = 0.2381,<br>Δε = +18.4 |
| 14) | n-C$_3$H$_7$ | — |  | 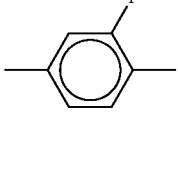 | 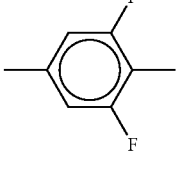 | |
| 15) | n-C$_4$H$_9$ | — |  | 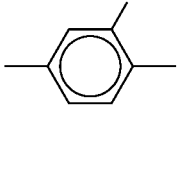 | 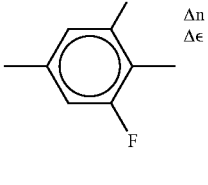 | C 26 S$_A$ 113 I<br>Δn = 0.2277,<br>Δε = +16.9 |
| 16) | n-C$_5$H$_{11}$ | — |  | 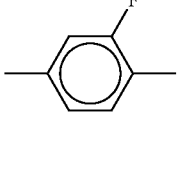 | 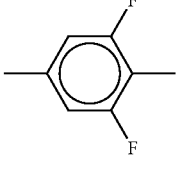 | |
| 17) | C$_2$H$_5$ | — |  | 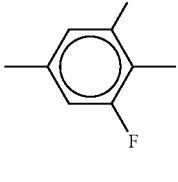 | 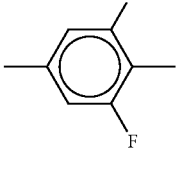 | |
| 18) | n-C$_3$H$_7$ | — |  | 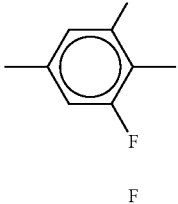 | 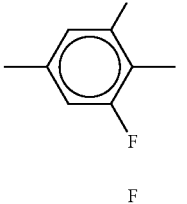 | |
| 19) | n-C$_4$H$_9$ | — |  | 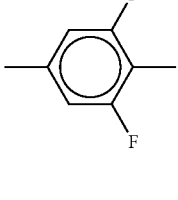 | 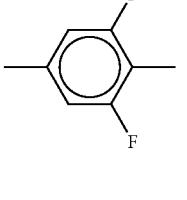 | |

-continued
| No. | R | A$^1$ | A$^2$ | A$^3$ | A$^4$ | |
|---|---|---|---|---|---|---|
| 20) | n-C$_5$H$_{11}$ | — |  | 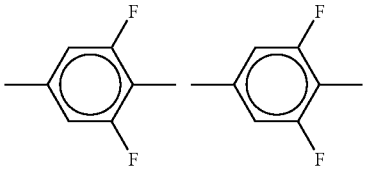 |  | C 82 I<br>Δn = 0.2200,<br>Δε = +24.5 |
| 21) | C$_2$H$_5$ | — |  | 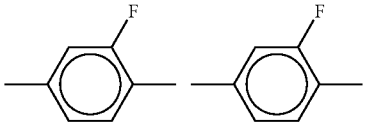 |  | |
| 22) | n-C$_3$H$_7$ | — |  | 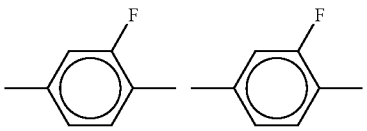 |  | |
| 23) | n-C$_4$H$_9$ | — |  | 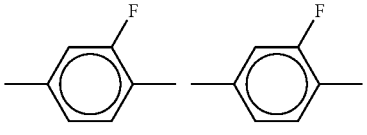 |  | |
| 24) | n-C$_5$H$_{11}$ | — |  | 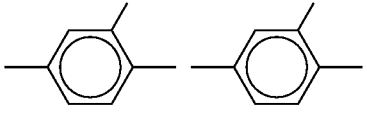 |  | |
| 25) | C$_2$H$_5$ | — | 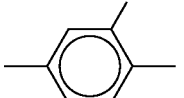 | 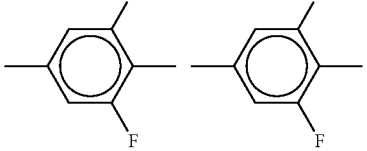 |  | |
| 26) | n-C$_3$H$_7$ | — | 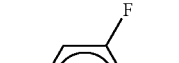 | 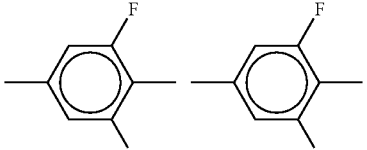 |  | |
| 27) | n-C$_4$H$_9$ | — |  | 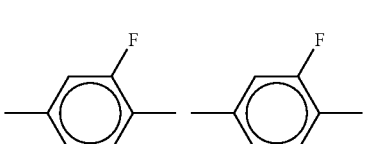 |  | |
| 28) | n-C$_5$H$_{11}$ | — |  |  |  | |

-continued

| No. | R | A¹ | A² | A³ | A⁴ | |
|---|---|---|---|---|---|---|
| 29) | C₂H₅ | — | 2-F-phenylene | 2-F-phenylene | 2,3,5-F₃-phenylene | |
| 30) | n-C₃H₇ | — | 2-F-phenylene | 2-F-phenylene | 2,3,5-F₃-phenylene | |
| 31) | n-C₄H₉ | — | 2-F-phenylene | 2-F-phenylene | 2,3,5-F₃-phenylene | |
| 32) | n-C₅H₁₁ | — | 2-F-phenylene | 2-F-phenylene | 2,3,5-F₃-phenylene | |
| 33) | C₂H₅ | cyclohexyl | phenylene | 2-F-phenylene | 2,3,5-F₃-phenylene | |
| 34) | n-C₃H₇ | cyclohexyl | phenylene | 2-F-phenylene | 2,3,5-F₃-phenylene | C 78 S$_C$ (68) S$_A$ 182 N 263.6 I<br>Δn = 0.2188,<br>Δε = +14.9 |
| 35) | n-C₄H₉ | cyclohexyl | phenylene | 2-F-phenylene | 2,3,5-F₃-phenylene | |
| 36) | n-C₅H₁₁ | cyclohexyl | phenylene | 2-F-phenylene | 2,3,5-F₃-phenylene | |

-continued
| No. | R | A¹ | A² | A³ | A⁴ |
|---|---|---|---|---|---|
| 37) | $C_2H_5$ | 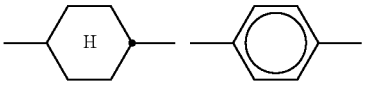 |  | 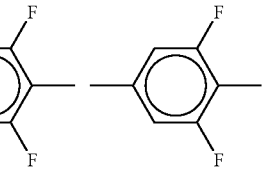 |  |
| 38) | $n\text{-}C_3H_7$ | 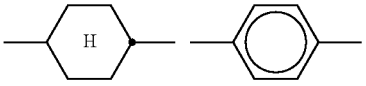 |  | 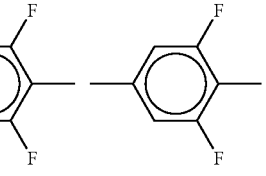 |  |
| 39) | $n\text{-}C_4H_9$ | 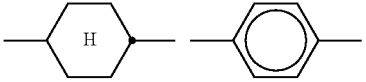 |  | 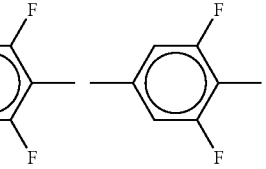 |  |
| 40) | $n\text{-}C_5H_{11}$ | 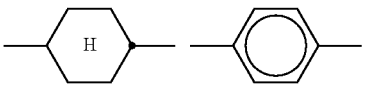 |  | 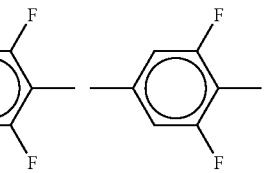 |  |
| 41) | $C_2H_5$ |  | 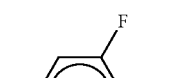 | 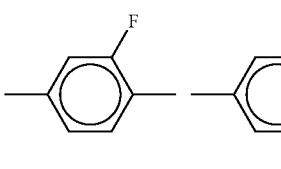 | 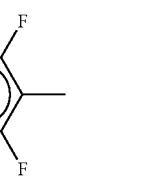 |
| 42) | $n\text{-}C_3H_7$ | 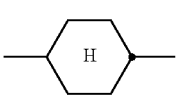 | 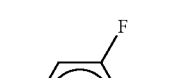 | 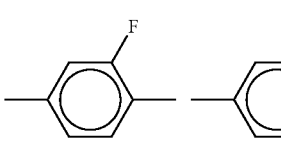 | 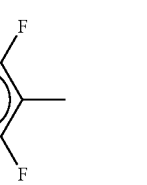 |
| 43) | $n\text{-}C_4H_9$ | 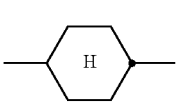 | 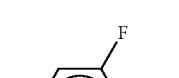 | 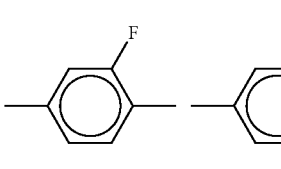 | 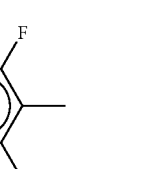 |
| 44) | $n\text{-}C_5H_{11}$ | 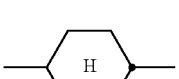 | 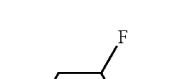 | 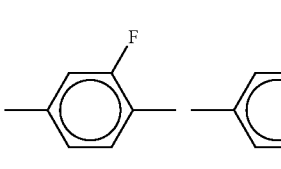 | 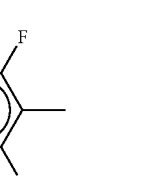 |

-continued

| No. | R | A¹ | A² | A³ | A⁴ |
|---|---|---|---|---|---|
| 45) | C₂H₅ | cyclohexyl (H) | 2-F phenyl | 2,3-diF phenyl | 2,3-diF phenyl |
| 46) | n-C₃H₇ | cyclohexyl (H) | 2-F phenyl | 2,3-diF phenyl | 2,3-diF phenyl |
| 47) | n-C₄H₉ | cyclohexyl (H) | 2-F phenyl | 2,3-diF phenyl | 2,3-diF phenyl |
| 48) | n-C₅H₁₁ | cyclohexyl (H) | 2-F phenyl | 2,3-diF phenyl | 2,3-diF phenyl |
| 49) | C₂H₅ | phenyl | phenyl | 2-F phenyl | 2,3-diF phenyl |
| 50) | n-C₃H₇ | phenyl | phenyl | 2-F phenyl | 2,3-diF phenyl |
| 51) | n-C₄H₉ | phenyl | phenyl | 2-F phenyl | 2,3-diF phenyl |
| 52) | n-C₅H₁₁ | phenyl | phenyl | 2-F phenyl | 2,3-diF phenyl |

-continued
| No. | R | A¹ | A² | A³ | A⁴ |
|---|---|---|---|---|---|
| 53) | C$_2$H$_5$ | 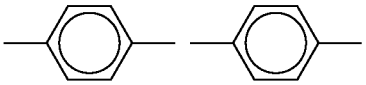 |  | 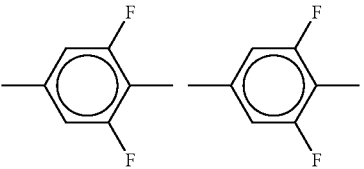 |  |
| 54) | n-C$_3$H$_7$ | 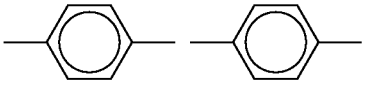 |  | 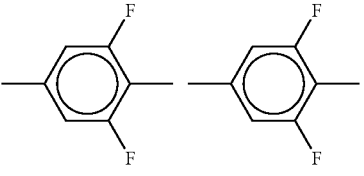 |  |
| 55) | n-C$_4$H$_9$ | 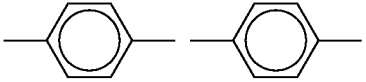 |  | 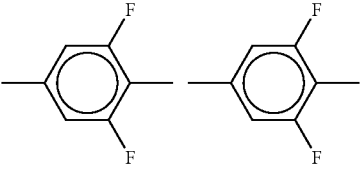 |  |
| 56) | n-C$_5$H$_{11}$ | 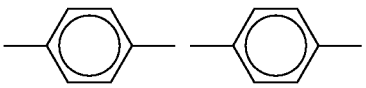 |  | 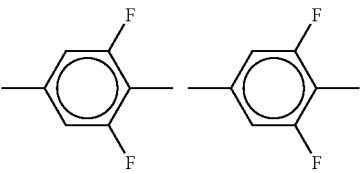 |  |
| 57) | C$_2$H$_5$ | 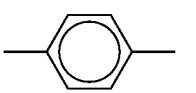 |  |  |  |
| 58) | n-C$_3$H$_7$ | 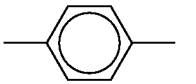 |  |  |  |
| 59) | n-C$_4$H$_9$ | 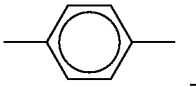 | 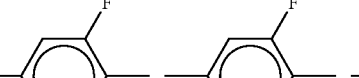 |  |  |
| 60) | n-C$_5$H$_{11}$ | 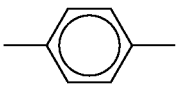 |  |  |  |

-continued
| No. | R | A¹ | A² | A³ | A⁴ |
|---|---|---|---|---|---|
| 61) | C₂H₅ |  | 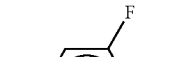 | 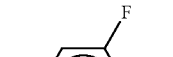 | 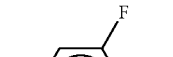 |
| 62) | n-C₃H₇ |  | 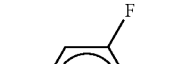 | 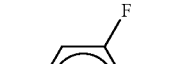 | 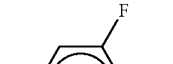 |
| 63) | n-C₄H₉ |  | 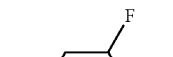 | 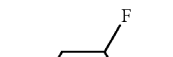 | 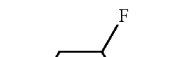 |
| 64) | n-C₅H₁₁ |  |  |  |  |
| 65) | C₂H₅ |  | 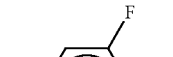 | 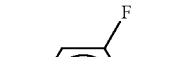 | 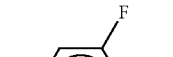 |
| 66) | n-C₃H₇ |  | 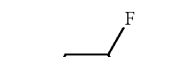 | 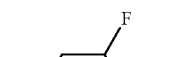 | 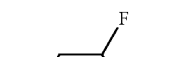 |
| 67) | n-C₄H₉ |  | 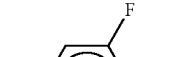 | 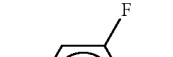 | 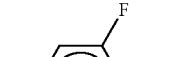 |
| 68) | n-C₅H₁₁ |  |  |  |  |

-continued

| No. | R | A¹ | A² | A³ | A⁴ |
|---|---|---|---|---|---|
| 69) | C₂H₅ | 3-F phenyl | 3-F phenyl | 3-F phenyl | 3,5-di-F phenyl |
| 70) | n-C₃H₇ | 3-F phenyl | 3-F phenyl | 3-F phenyl | 3,5-di-F phenyl |
| 71) | n-C₄H₉ | 3-F phenyl | 3-F phenyl | 3-F phenyl | 3,5-di-F phenyl |
| 72) | n-C₅H₁₁ | 3-F phenyl | 3-F phenyl | 3-F phenyl | 3,5-di-F phenyl |
| 73) | C₂H₅ | 3-F phenyl | 3-F phenyl | 3,5-di-F phenyl | 3,5-di-F phenyl |
| 74) | n-C₃H₇ | 3-F phenyl | 3-F phenyl | 3,5-di-F phenyl | 3,5-di-F phenyl |
| 75) | n-C₄H₉ | 3-F phenyl | 3-F phenyl | 3,5-di-F phenyl | 3,5-di-F phenyl |
| 76) | n-C₅H₁₁ | 3-F phenyl | 3-F phenyl | 3,5-di-F phenyl | 3,5-di-F phenyl |

-continued
| No. | R | A¹ | A² | A³ | A⁴ |
|---|---|---|---|---|---|
| 77) | C₂H₅ | 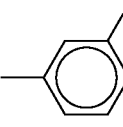 | 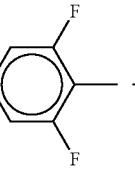 | 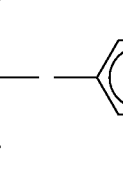 |  |
| 78) | n-C₃H₇ | 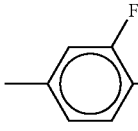 | 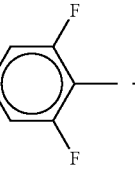 | 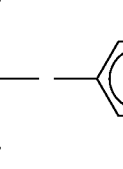 |  |
| 79) | n-C₄H₉ | 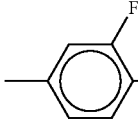 | 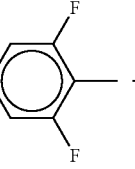 | 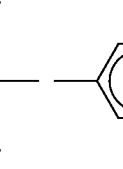 |  |
| 80) | n-C₅H₁₁ | 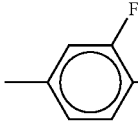 | 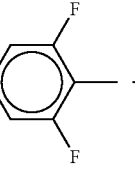 | 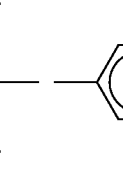 |  |
| 81) | C₂H₅ | 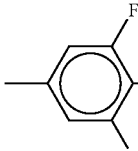 | 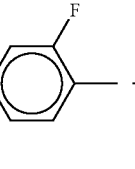 | 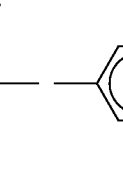 |  |
| 82) | n-C₃H₇ | 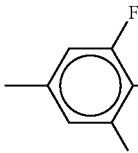 | 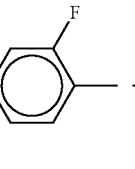 | 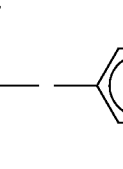 |  |
| 83) | n-C₄H₉ | 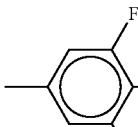 | 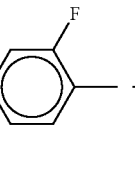 | 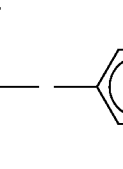 |  |
| 84) | n-C₅H₁₁ | 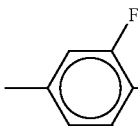 | 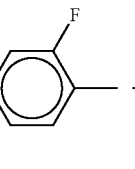 | 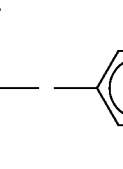 |  |

-continued
| No. | R | A¹ | A² | A³ | A⁴ |
|---|---|---|---|---|---|
| 85) | C₂H₅ | 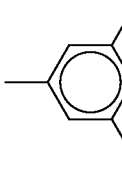 | 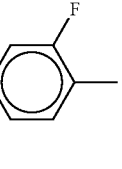 | 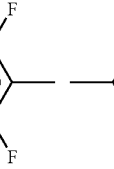 |  |
| 86) | n-C₃H₇ | 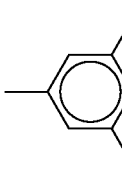 | 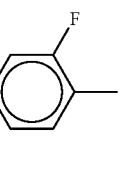 | 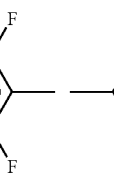 |  |
| 87) | n-C₄H₉ | 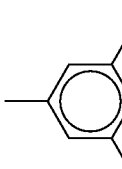 | 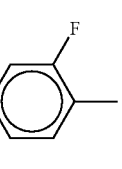 | 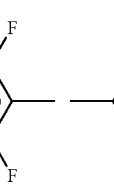 |  |
| 88) | n-C₅H₁₁ | 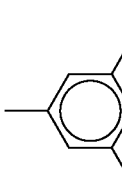 | 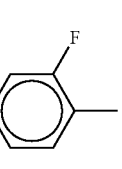 | 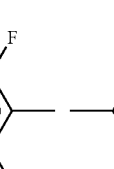 |  |
| 89) | C₂H₅ | 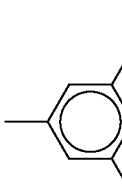 | 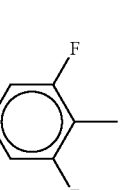 | 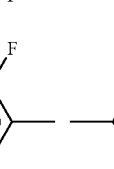 |  |
| 90) | n-C₃H₇ | 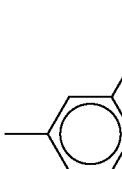 | 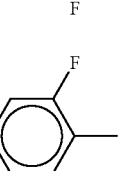 | 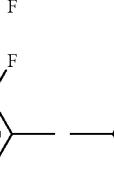 |  |
| 91) | n-C₄H₉ | 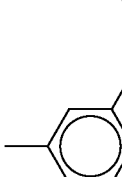 | 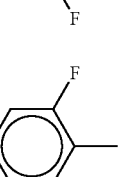 | 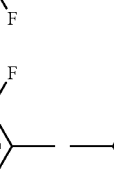 |  |
| 92) | n-C₅H₁₁ | 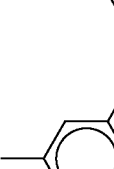 | 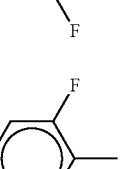 | 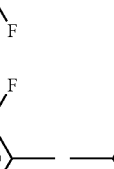 |  |

Comparative Example 1

An LC mixture is formulated as follows:

| | | | |
|---|---|---|---|
| GGP-3-Cl | 6.00% | Clearing point [° C.]: | 77.0 |
| BCH-F•F•F | 15.00% | Δn [589 nm, 20° C.]: | 0.1309 |
| BCH-F•F•F | 10.00% | Δε [kHz, 20° C.]: | +13.7 |
| CCQU-2-F | 10.00% | γ$_1$ [mPa · s, 20° C.]: | 147 |
| CCQU-3-F | 10.00% | V$_{10}$ [V]: | 1.05 |
| CCQU-5-F | 3.00% | | |
| CGU-3-F | 8.00% | | |
| CCGU-3-F | 2.00% | | |
| PUQU-3-F | 10.00% | | |
| CPGU-3-OT | 8.00% | | |
| CC-3-V | 7.00% | | |
| PP-1-2V1 | 4.00% | | |
| CCP-1 | 4.00% | | |
| PGP-2-4 | 3.00% | | |

Mixture Example 1

An LC mixture is formulated as follows:

| | | | |
|---|---|---|---|
| GGP-3-Cl | 6.00% | Clearing point [° C.]: | 78.0 |
| BCH-F•F•F | 15.00% | Δn [589 nm, % 20° C.]: | 0.1307 |
| BCH-F•F•F | 10.00% | Δε [kHz, 20° C.]: | +13.9 |
| CCQU-2-F | 10.00% | γ$_1$ [mPa · s, 20° C.]: | 141 |
| CCQU-3-F | 10.00% | V$_{10}$ [V]: | 1.07 |
| CCQU-5-F | 3.00% | | |
| CGU-3-OXF | 9.00% | | |
| CCGU-3-F | 2.00% | | |
| PUQU-3-F | 10.00% | | |
| CPGU-3-OT | 8.00% | | |
| CC-3-V | 7.50% | | |
| PP-1-2V1 | 5.50% | | |
| CCP-1 | 4.00% | | |

The mixture has lower viscosity compared with Comparative Example 1 with the other properties virtually unchanged.

Mixture Example 2

An LC mixture is formulated as follows:

| | | | |
|---|---|---|---|
| PGU-4-OXF | 5.00% | Clearing point [° C.]: | 76.0 |
| BCH-F•F•F | 15.00% | Δn [589 nm, 20° C.]: | 0.1303 |
| BCH-F•F•F | 10.00% | Δε [kHz, 20° C.]: | +14.0 |
| CCQU-2-F | 10.00% | γ$_1$ [mPa · s, 20° C.]: | 141 |
| CCQU-3-F | 10.00% | V$_{10}$ [V]: | 1.04 |
| CCQU-5-F | 3.00% | | |
| CGU-3-F | 8.00% | | |
| CCGU-3-F | 2.00% | | |
| PUQU-3-F | 10.00% | | |
| CPGU-3-OT | 8.00% | | |
| CC-3-V | 6.00% | | |
| PP-1-2V1 | 4.00% | | |
| CCP-1 | 4.00% | | |
| PGP-2-4 | 5.00% | | |

The mixture has lower viscosity compared with Comparative Example 1 with the other properties virtually unchanged.

Mixture Example 3

An LC mixture is formulated as follows:

| | | | |
|---|---|---|---|
| GGP-3-Cl | 6.00% | Clearing point [° C.]: | 76.0 |
| CPU-3-OXF | 25.00% | Δn [589 nm, 20° C.]: | 0.1314 |
| CCQU-2-F | 10.00% | Δε [kHz, 20° C.]: | +14.9 |
| CCQU-3-F | 10.00% | γ$_1$ [mPa · s, 20° C.]: | 119 |
| CCQU-5-F | 3.00% | V$_{10}$ [V]: | 1.02 |
| CGU-3-F | 8.00% | | |
| PUQU-3-F | 14.00% | | |
| CPGU-3-OT | 8.00% | | |
| CC-3-V | 11.50% | | |
| PP-1-2V1 | 3.50% | | |
| CCP-1 | 1.00% | | |

The mixture has lower viscosity compared with Comparative Example 1 with the other properties virtually unchanged.

Mixture Example 4

An LC mixture is formulated as follows:

| | | | |
|---|---|---|---|
| GGP-3-Cl | 6.00% | Clearing point [° C.]: | 78.0 |
| CPU-3-OXF | 25.00% | Δn [589 nm, 20° C.]: | 0.1321 |
| CCQU-2-F | 10.00% | Δε [kHz, 20° C.]: | +14.9 |
| CCQU-3-F | 11.00% | γ$_1$ [mPa · s, 20° C.]: | 113 |
| CGU-3-OXF | 9.00% | V$_{10}$ [V]: | 1.07 |
| PUQU-3-F | 14.50% | | |
| CPGU-3-OT | 8.00% | | |
| CC-3-V | 14.50% | | |
| PP-1-2V1 | 2.00% | | |

The mixture has lower viscosity compared with Comparative Example 1 with the other properties virtually unchanged.

Mixture Example 5

An LC mixture is formulated as follows:

| | | | |
|---|---|---|---|
| GGP-3-Cl | 4.00% | Clearing point [° C.]: | 79.5 |
| CPU-3-OXF | 25.00% | Δn [589 nm, 20° C.]: | 0.1305 |
| CCQU-2-F | 5.00% | Δε [kHz, 20° C.]: | +15.1 |
| CCQU-3-F | 6.00% | γ$_1$ [mPa · s, 20° C.]: | 108 |
| CCU-3-OXF | 10.00% | V$_{10}$ [V]: | 1.04 |
| CGU-3-OXF | 9.00% | | |
| PUQU-3-F | 17.00% | | |
| CPGU-3-OT | 8.00% | | |
| CC-3-V | 16.00% | | |

The mixture has lower viscosity and a higher clearing point compared with Comparative Example 1 with the other properties virtually unchanged.

Comparative Example 2

An LC mixture is formulated as follows:

| | | | |
|---|---|---|---|
| GGP-3-Cl | 8.00% | Clearing point [° C.]: | 76.0 |
| BCH-F•F•F | 17.00% | Δn [589 nm, 20° C.]: | 0.1302 |
| BCH-F•F•F | 9.00% | Δε [kHz, 20° C.]: | +14.4 |
| CCQU-2-F | 10.00% | γ$_1$ [mPa · s, 20° C.]: | 132 |
| CCQU-3-F | 10.00% | V$_{10}$ [V]: | 1.05 |
| APUQU-3-F | 11.00% | | |
| PUQU-3-F | 11.00% | | |

-continued

| | |
|---|---|
| PGP-2-4 | 5.00% |
| PP-1-2V1 | 2.00% |
| CC-3-V | 9.00% |
| CCP-V-1 | 8.00% |

Mixture Example 6

An LC mixture is formulated as follows:

| | | | |
|---|---|---|---|
| GGP-3-Cl | 8.00% | Clearing point [° C.]: | 77.0 |
| CPU-3-OXF | 17.00% | Δn [589 nm, 20° C.]: | 0.1327 |
| CPU-5-OXF | 9.00% | Δε [kHz, 20° C.]: | +16.3 |
| CCQU-2-F | 10.00% | $\gamma_1$ [mPa·s, 20° C.]: | 118 |
| CCQU-3-F | 10.00% | $V_{10}$ [V]: | 1.03 |
| APUQU-3-F | 11.00% | | |
| PUQU-3-F | 15.00% | | |
| PP-1-2V1 | 4.00% | | |
| CC-3-V | 11.00% | | |
| CCP-V-1 | 5.00% | | |

The mixture has lower viscosity and higher birefringence compared with Comparative Example 2 with the other properties virtually unchanged.

Comparative Example 3

An LC mixture is formulated as follows:

| | | | |
|---|---|---|---|
| CDU-2-F | 4.00% | Clearing point [° C.]: | 73.5 |
| PGU-3-F | 8.50% | Δn [589 nm, 20° C.]: | 0.0995 |
| PUQU-3-F | 15.50% | Δε [kHz, 20° C.]: | +8.6 |
| CCP-V-1 | 13.50% | $\gamma_1$ [mPa·s, 20° C.]: | 62 |
| CCP-V2-1 | 10.00% | | |
| CC-3-V1 | 12.00% | | |
| CC-3-V | 28.50% | | |
| APUQU-2-F | 8.00% | | |

Mixture Example 7

An LC mixture is formulated as follows:

| | | | |
|---|---|---|---|
| CDU-2-F | 5.00% | Clearing point [° C.]: | 73.5 |
| PGU-2-OXF | 9.00% | Δn [589 nm, 20° C.]: | 0.0989 |
| PUQU-3-F | 15.00% | Δε [kHz, 20° C.]: | +8.5 |
| CCP-V-1 | 14.00% | $\gamma_1$ [mPa·s, 20° C.]: | 59 |
| CCP-V2-1 | 7.00% | | |
| CC-3-V1 | 12.00% | | |
| CC-3-V | 30.00% | | |
| APUQU-2-F | 8.00% | | |

The mixture has lower viscosity compared with Comparative Example 3 with the other properties virtually unchanged.

Mixture Example 8

An LC mixture is formulated as follows:

| | | | |
|---|---|---|---|
| PUQU-2-F | 8.00% | Clearing point [° C.]: | 75.0 |
| PUQU-3-F | 8.00% | Δn [589 nm, 20° C.]: | 0.1001 |
| CCP-V-1 | 15.00% | Δε [kHz, 20° C.]: | +8.1 |
| CCP-V2-1 | 5.00% | $\gamma_1$ [mPa·s, 20° C.]: | 57 |
| CC-3-V1 | 10.00% | | |
| CC-3-V | 30.00% | | |
| APUQU-2-F | 9.00% | | |
| CPU-2-OXF | 8.00% | | |
| CPU-3-OXF | 7.00% | | |

The mixture has lower viscosity compared with Comparative Example 3 with the other properties virtually unchanged.

Comparative Example 4

An LC mixture is formulated as follows:

| | | | |
|---|---|---|---|
| CCP-20CF3 | 2.00% | Clearing point [° C.]: | 79.0 |
| CCP-30CF3 | 8.00% | Δn [589 nm, 20° C.]: | 0.1105 |
| PGU-2-F | 9.00% | Δε [kHz, 20° C.]: | +10.9 |
| PGU-3-F | 2.00% | $\gamma_1$ [mPa·s, 20° C.]: | 76 |
| PUQU-3-F | 19.00% | | |
| CC-3-V1 | 12.00% | | |
| CC-3-V | 18.00% | | |
| CCP-V-1 | 11.00% | | |
| CCP-V2-1 | 10.00% | | |
| APUQU-2-F | 9.00% | | |

Mixture Example 9

An LC mixture is formulated as follows:

| | | | |
|---|---|---|---|
| CCP-20CF3 | 3.50% | Clearing point [° C.]: | 79.5 |
| CCP-30CF3 | 8.00% | Δn [589 nm, 20° C.]: | 0.1110 |
| PGU-4-OXF | 11.00% | Δε [kHz, 20° C.]: | +10.8 |
| PUQU-3-F | 20.00% | $\gamma_1$ [mPa·s, 20° C.]: | 74 |
| CC-3-V1 | 11.50% | | |
| CC-3-V | 19.00% | | |
| CCP-V-1 | 10.00% | | |
| CCP-V2-1 | 8.00% | | |
| APUQU-2-F | 9.00% | | |

The mixture has lower viscosity compared with Comparative Example 4 with the other properties virtually unchanged.

Mixture Example 10

An LC mixture is formulated as follows:

| | | | |
|---|---|---|---|
| CCP-20CF3 | 4.00% | Clearing point [° C.]: | 79.0 |
| CCP-30CF3 | 8.00% | Δn [589 nm, 20° C.]: | 0.1115 |
| PGU-4-OXF | 11.00% | Δε [kHz, 20° C.]: | +11.1 |
| PUQU-3-F | 20.00% | $\gamma_1$ [mPa·s, 20° C.]: | 72 |
| CC-3-V1 | 8.50% | | |
| CC-3-V | 21.50% | | |
| CCP-V-1 | 9.00% | | |
| CCP-V2-1 | 9.00% | | |
| APUQU-2-F | 9.00% | | |

The mixture has lower viscosity compared with Comparative Example 4 with the other properties virtually unchanged.

Comparative Example 5

An LC mixture is formulated as follows:

| | | | |
|---|---|---|---|
| APUQU-2-F | 7.50% | Clearing point [° C.]: | 89.9 |
| PUQU-3-F | 5.00% | Δn [589 nm, 20° C.]: | 0.1302 |
| PGU-2-F | 7.00% | Δε [kHz, 20° C.]: | +6.9 |
| PGU-3-F | 7.00% | $\gamma_1$ [mPa · s, 20° C.]: | 86 |
| GGP-3-Cl | 5.50% | | |
| CP-3-Cl | 3.00% | | |
| CC-3-V | 28.50% | | |
| CCP-V-1 | 15.00% | | |
| CCP-V2-1 | 13.00% | | |
| PGP-2-3 | 7.50% | | |
| CBC-33F | 1.00% | | |

Mixture Example 11

An LC mixture is formulated as follows:

| | | | |
|---|---|---|---|
| APUQU-2-F | 9.00% | Clearing point [° C.]: | 89.0 |
| PUQU-3-F | 4.00% | Δn [589 nm, 20° C.]: | 0.1285 |
| PGU-2-F | 9.00% | Δε [kHz, 20° C.]: | +7.0 |
| PGU-3-F | 4.50% | $\gamma_1$ [mPa · s, 20° C.]: | 76 |
| CP-3-Cl | 3.50% | | |
| CC-3-V | 30.50% | | |
| CCP-V-1 | 18.00% | | |
| CCP-V2-1 | 7.00% | | |
| PGP-2-3 | 6.00% | | |
| PGP-2-4 | 5.00% | | |
| CPGU-3-OXF | 3.50% | | |

The mixture has lower viscosity compared with Comparative Example 5 with the other properties virtually unchanged.

Comparative Example 6

An LC mixture is formulated as follows:

| | | | |
|---|---|---|---|
| GGP-3-Cl | 7.00% | Clearing point [° C.]: | 76.5 |
| BCH-3F•F•F | 5.00% | Δn [589 nm, 20° C.]: | 0.1078 |
| PUQU-2-F | 5.00% | Δε [kHz, 20° C.]: | +4.7 |
| PUQU-3-F | 10.00% | $\gamma_1$ [mPa · s, 20° C.]: | 56 |
| CC-3-V1 | 8.00% | $V_{10}$ [V]: | 1.95 |
| CCP-V-1 | 14.00% | | |
| CCP-V2-1 | 9.00% | | |
| PGP-2-3 | 6.50% | | |
| CC-3-V | 35.50% | | |

Mixture Example 12

An LC mixture is formulated as follows:

| | | | |
|---|---|---|---|
| CC-3-V | 44.00% | Clearing point [° C.]: | 75.5 |
| CC-3-V1 | 6.00% | Δn [589 nm, 20° C.]: | 0.1063 |
| CCP-V-1 | 6.00% | Δε [kHz, 20° C.]: | +4.4 |
| PGP-2-3 | 4.00% | $\gamma_1$ [mPa · s, 20° C.]: | 47 |
| PGP-2-4 | 5.00% | $V_{10}$ [V]: | 1.96 |
| PUQU-2-F | 5.00% | | |
| CPU-3-OXF | 30.00% | | |

The mixture has lower viscosity compared with Comparative Example 6 with the other properties virtually unchanged.

Comparative Example 7

An LC mixture is formulated as follows:

| | | | |
|---|---|---|---|
| GGP-3-Cl | 5.00% | Clearing point [° C.]: | 75.5 |
| CC-3-V1 | 35.00% | Δn [589 nm, 20° C.]: | 0.1174 |
| CCP-V-1 | 19.00% | Δε [kHz, 20° C.]: | +5.3 |
| BCH-3F•F•F | 18.00% | $\gamma_1$ [mPa · s, 20° C.]: | 63 |
| PUQU-3-F | 11.00% | $V_{10}$ [V]: | 1.75 |
| PGP-2-4 | 6.00% | | |
| PGP-2-5 | 6.00% | | |

Mixture Example 13

An LC mixture is formulated as follows:

| | | | |
|---|---|---|---|
| GGP-3-Cl | 2.00% | Clearing point [° C.]: | 76.0 |
| CC-3-V1 | 36.00% | Δn [589 nm, 20° C.]: | 0.1162 |
| CCP-V-1 | 14.50% | Δε [kHz, 20° C.]: | +5.4 |
| CPU-3-OXF | 30.00% | $\gamma_1$ [mPa · s, 20° C.]: | 55 |
| PUQU-3-F | 8.00% | $V_{10}$ [V]: | 1.76 |
| PGP-2-4 | 4.00% | | |
| PP-1-2V1 | 5.50% | | |

The mixture has lower viscosity compared with Comparative Example 7 with the other properties virtually unchanged.

Comparative Example 8

An LC mixture is formulated as follows:

| | | | |
|---|---|---|---|
| GGP-3-Cl | 9.00% | Clearing point [° C.]: | 72.5 |
| GGP-5-Cl | 7.00% | Δn [589 nm, 20° C.]: | 0.1450 |
| CGU-3-F | 4.50% | Δε [kHz, 20° C.]: | +4.5 |
| PUQU-3-F | 9.50% | $\gamma_1$ [mPa · s, 20° C.]: | 68 |
| CCP-V-1 | 11.00% | $V_{10}$ [V]: | 1.94 |
| PGP-2-3 | 5.00% | | |
| PGP-2-4 | 7.00% | | |
| PGP-2-5 | 8.00% | | |
| PP-1-2V1 | 6.00% | | |
| CC-3-V | 33.00% | | |

Mixture Example 14

An LC mixture is formulated as follows:

| | | | |
|---|---|---|---|
| GGP-3-Cl | 8.00% | Clearing point [° C.]: | 75.5 |
| PUQU-3-F | 9.00% | Δn [589 nm, 20° C.]: | 0.1455 |
| CPU-3-OXF | 15.00% | Δε [kHz, 20° C.]: | +4.8 |
| CCP-V-1 | 9.00% | $\gamma_1$ [mPa · s, 20° C.]: | 63 |
| PGP-2-3 | 4.00% | $V_{10}$ [V]: | 2.01 |
| PGP-2-4 | 8.00% | | |
| PGP-2-5 | 8.00% | | |
| PP-1-2V1 | 8.00% | | |
| CC-3-V | 31.00% | | |

The mixture has lower viscosity and a higher clearing point compared with Comparative Example 8 with the other properties virtually unchanged.

The preceding examples can be repeated with similar success by substituting the generically or specifically described reactants and/or operating conditions of this invention for those used in the preceding examples.

While the invention has been illustrated with respect to the production and of particular compounds, it is apparent that variations and modifications of the invention can be made without departing from the spirit or scope of the invention.

The invention claimed is:

1. A liquid-crystalline medium, comprising at least two liquid crystalline compounds, wherein said medium contains one or more compounds of formula I

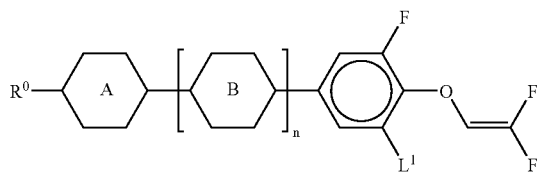

in which
$R^0$ is an alkyl or alkoxy radical having 1 to 15 C atoms, where, in addition, one or more $CH_2$ groups in these radicals may each be replaced, independently of one another, by —C≡C—, —$CF_2$O—, —CH=CH—,

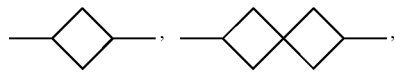

—O—, —CO—O— or —O—CO— in such a way that O atoms are not linked directly to one another, and in which, in addition, one or more H atoms may be replaced by halogen,
$L^1$ is H or F,
n is 1 or 2, and

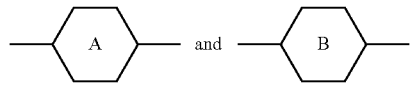

each, independently of one another, is

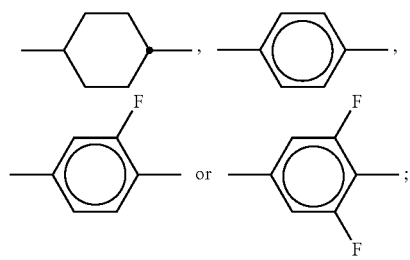

and, in addition to said one or more compounds of formula I, said medium further comprises one or more compounds of formulae II and/or III:

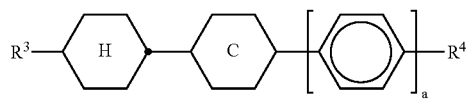

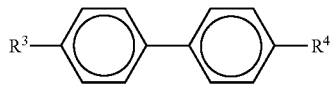

in which
ring C is 1,4-phenylene or trans-1,4-cyclohexylene,
a is 0 or 1,
$R^3$ is alkenyl having 2 to 9 C atoms, and
$R^4$ is an alkyl or alkoxy radical having 1 to 15 C atoms, where, in addition, one or more $CH_2$ groups in these radicals may each be replaced, independently of one another, by —C≡C—, —$CF_2$O—, —CH=CH—,

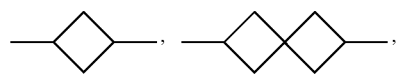

—O—, —CO—O— or —O—CO— in such a way that O atoms are not linked directly to one another, and in which, in addition, one or more H atoms may be replaced by halogen.

2. A liquid-crystalline medium according to claim 1, wherein said one or more compounds of formula I are selected from the following formulae:

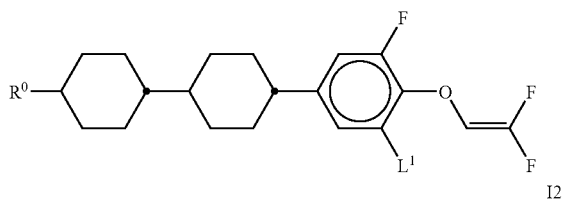

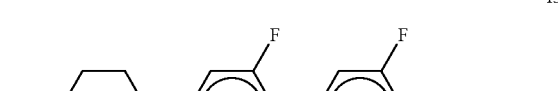

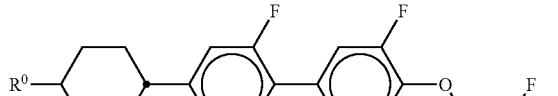

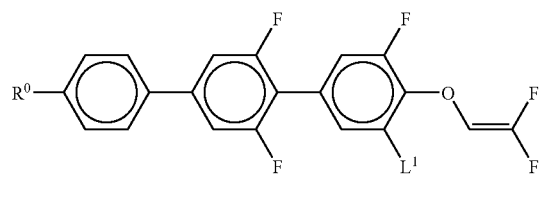
I5
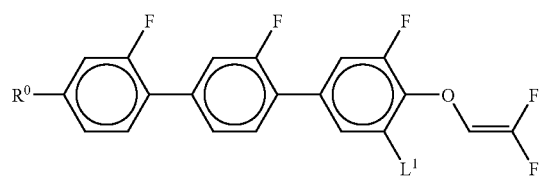
I6
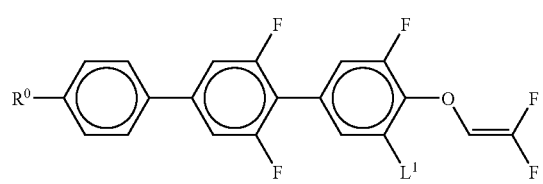
I7
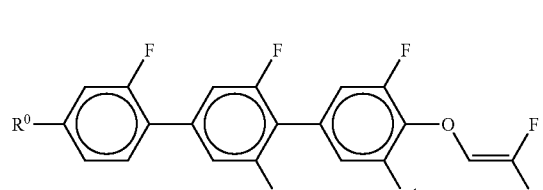
I8
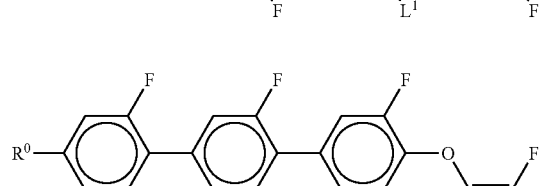
I9
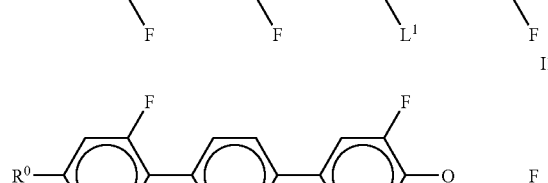
I10
I11
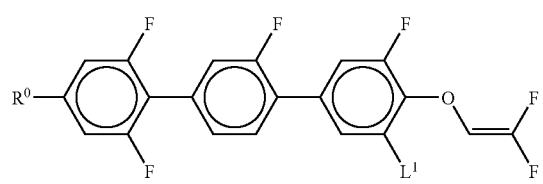
I12
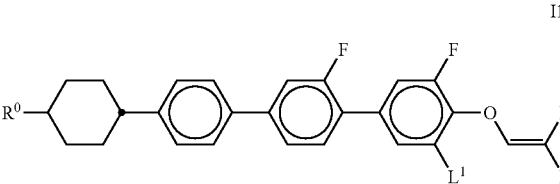
I13
I14
I15
I16
I17
I18
I19
I20
I21

-continued
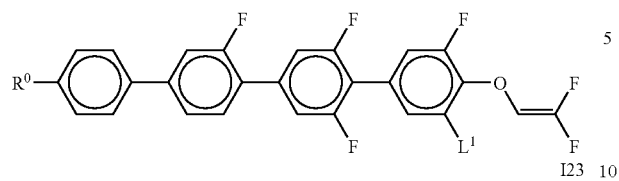
I22
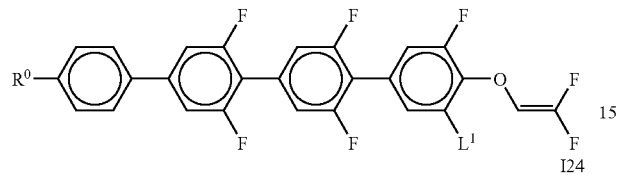
I23
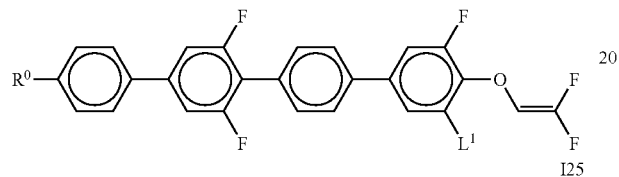
I24
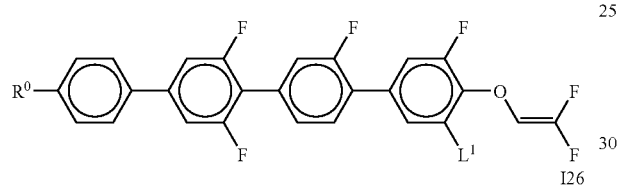
I25
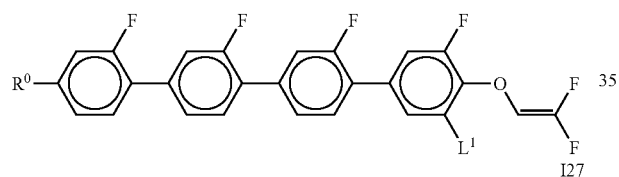
I26
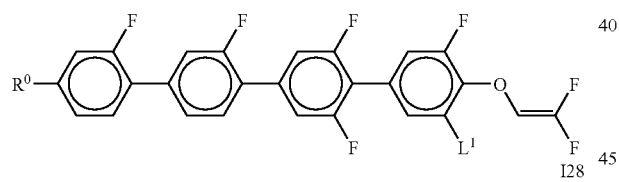
I27
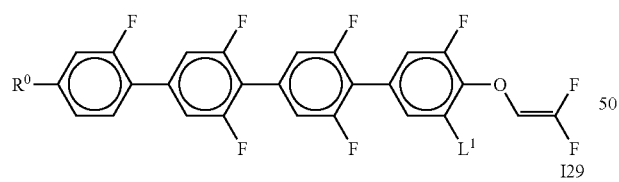
I28
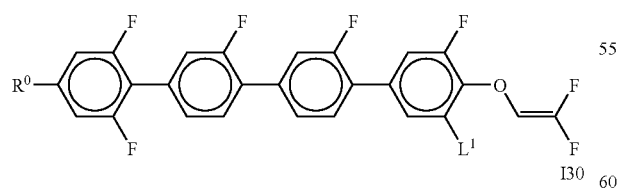
I29
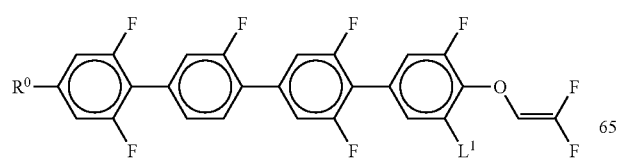
I30
-continued
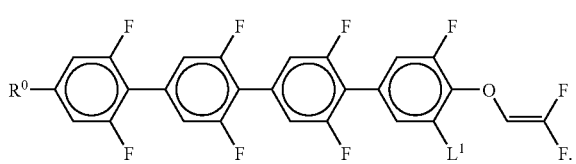
I31
3. A liquid-crystalline medium according to claim 1, wherein said one or more compounds of formulae II and/or III are selected from the following formulae:
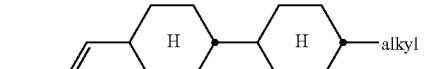
IIa
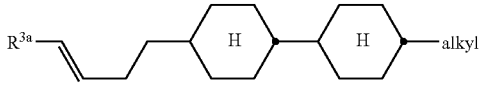
IIb
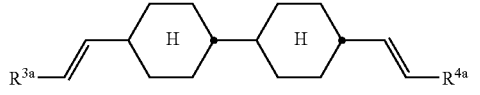
IIc
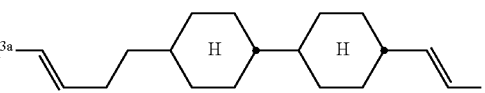
IId
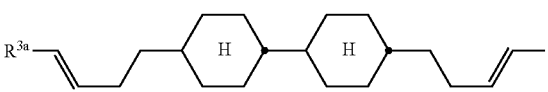
IIe
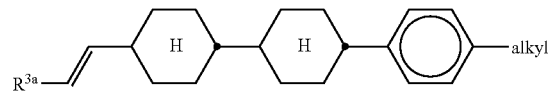
IIf
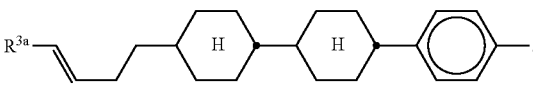
IIg
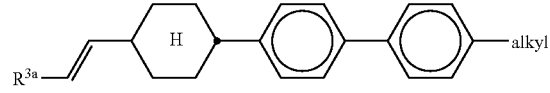
IIh
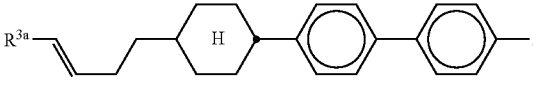
IIi
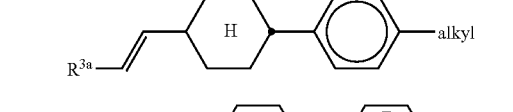
IIk
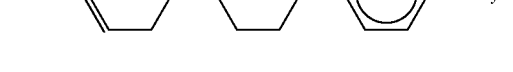
IIm

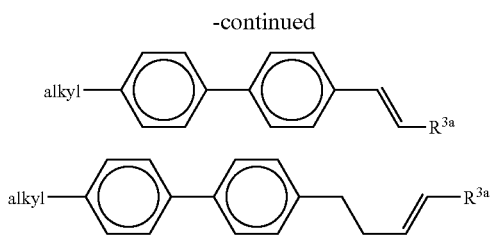

in which
R$^{3a}$ and R$^{4a}$ are each, independently of one another, H, CH$_3$, C$_2$H$_5$ or C$_3$H$_7$, and "alkyl" is a straight-chain alkyl group having 1 to 8 C atoms.

4. A liquid-crystalline medium according to claim 1, wherein, in addition to said one or more compounds of formula I, said medium comprises one or more compounds selected from the following formulae:

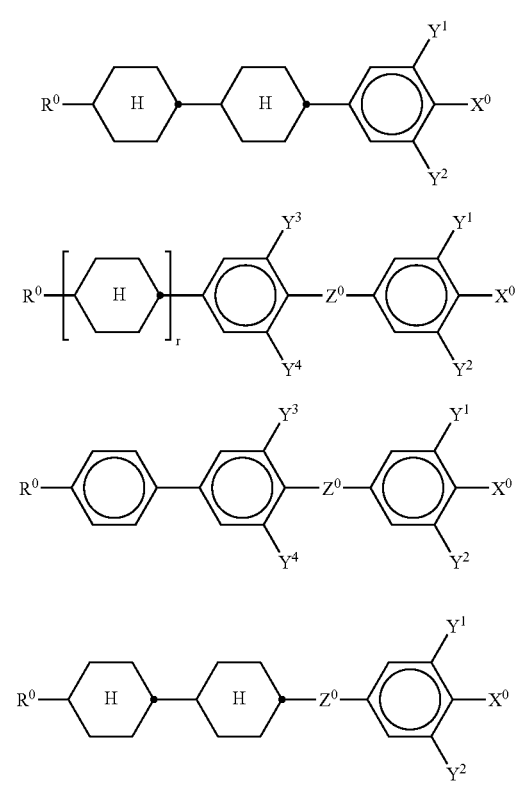

in which
R$^0$ is an alkyl or alkoxy radical having 1 to 15 C atoms, where, in addition, one or more CH$_2$ groups in these radicals may each be replaced, independently of one another, by —C≡C—, —CF$_2$O—, —CH=CH—, 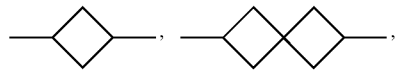 —O—, —CO—O— or —O—CO— in such a way that O atoms are not linked directly to one another, and in which, in addition, one or more H atoms may be replaced by halogen, Y$^{1-4}$ are each, independently of one another, H or F, X$^0$ is F, Cl, CN, SF$_5$, SCN, NCS, a halogenated alkyl radical having up to 6 C atoms, a halogenated alkenyl radical having up to 6 C atoms, a halogenated alkoxy radical having up to 6 C atoms, or a halogenated alkenyloxy radical having up to 6 C atoms, Z$^0$ is —C$_2$H$_4$—, —(CH$_2$)$_4$—, —CH=CH—, —CF=CF—, —C$_2$F$_4$—, —CH$_2$CF$_2$—, —CF$_2$CH$_2$—, —CH$_2$O—, —OCH$_2$—, —COO—, —CF$_2$O— or —OCF$_2$—, and, in formulae V and VI, Z$^0$ can also be a single bond, and r is 0 or 1.

5. A liquid-crystalline medium according to claim 4, wherein said medium comprises one or more compounds of formula IV selected from the following formulae:

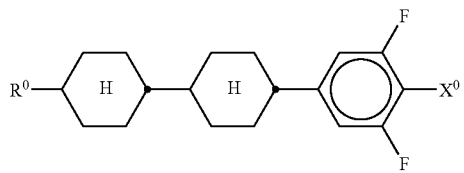

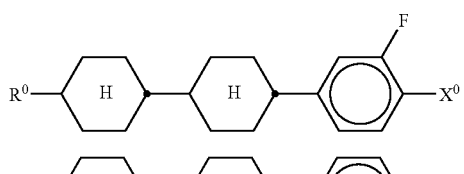

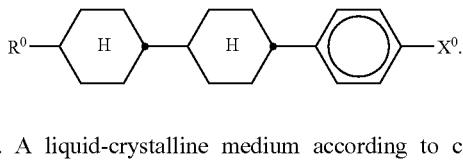

6. A liquid-crystalline medium according to claim 4, wherein said medium comprises one or more compounds of formula VI selected from the following formulae:

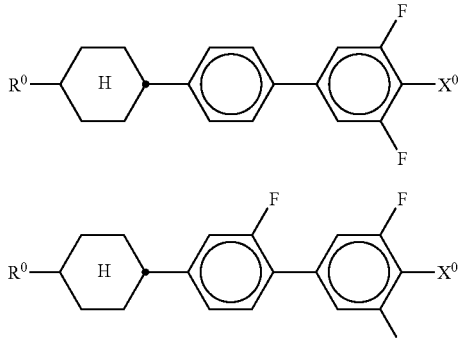

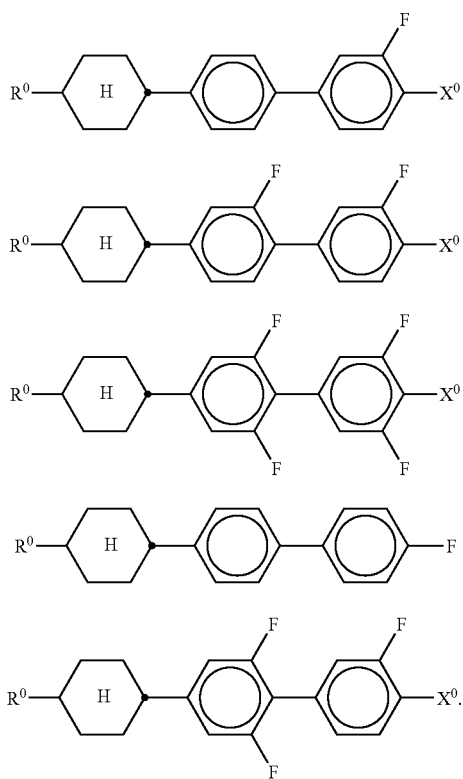

7. A liquid-crystalline medium according to claim 4, wherein said medium comprises one or more compounds of formula VI selected from the following formulae:

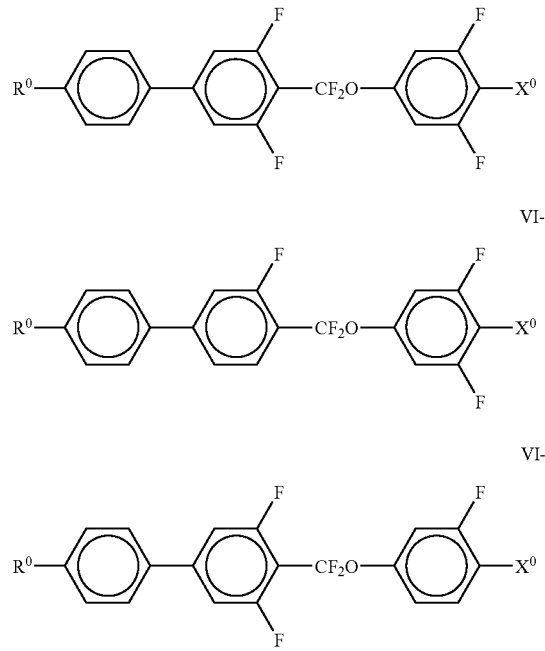

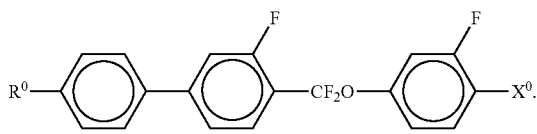

8. A liquid-crystalline medium according to claim 4, wherein said medium comprises one or more compounds of formula VII selected from the following formulae:

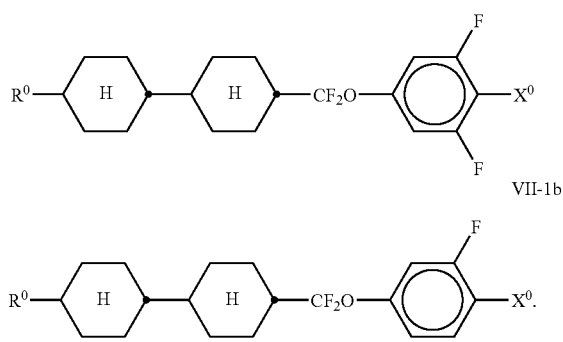

9. A liquid-crystalline medium according to claim 1, wherein, in addition to said one or more compounds of formula I, said medium comprises one or more compounds selected from the following formulae:

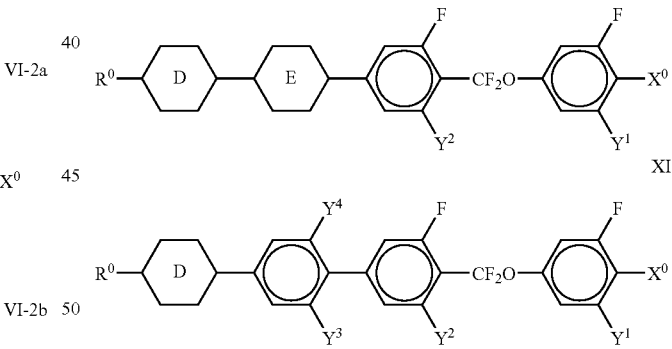

in which
- $R^0$ is an alkyl or alkoxy radical having 1 to 15 C atoms, where, in addition, one or more $CH_2$ groups in these radicals may each be replaced, independently of one another, by —C≡C—, —$CF_2$O—, —CH=CH—,

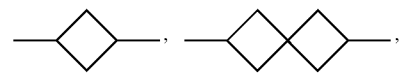

—O—, —CO—O— or —O—CO— in such a way that O atoms are not linked directly to one another, and in which, in addition, one or more H atoms may be replaced by halogen, $X^0$ is F, Cl, CN, SF$_5$, SCN, NCS, a halogenated alkyl radical having up to 6 C atoms, a halogenated alkenyl radical having up to 6 C atoms, a halogenated alkoxy radical having up to 6 C atoms, or a halogenated alkenyloxy radical having up to 6 C atoms, $Y^{1-4}$ are each, independently of one another, H or F, and

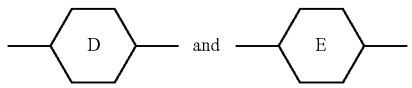

are each, independently of one another,

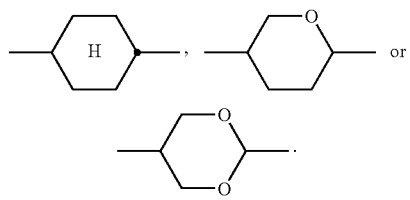

10. A liquid-crystalline medium according to claim 1, wherein, in addition to said one or more compounds of formula I, said medium comprises one or more compounds selected from the following formula:

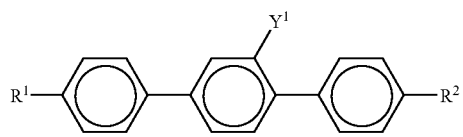

XII in which
R$^1$ and R$^2$ are each, independently of one another, n-alkyl having up to 9 C atoms, alkoxy having up to 9 C atoms, oxaalkyl having up to 9 C atoms, fluoroalkyl having up to 9 C atoms, or alkenyl having up to 9 C atoms; and
Y$^1$ is H or F.

11. A liquid-crystalline medium according to claim 1, wherein, in addition to said one or more compounds of formula I, said medium comprises one or more compounds selected from the following formula:

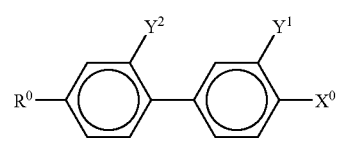

XII

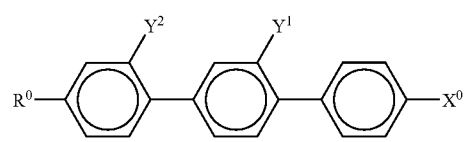

XIV

-continued

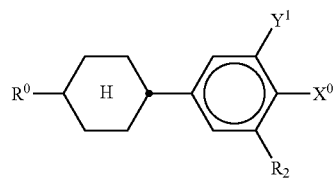

XV in which
R$^0$ is an alkyl or alkoxy radical having 1 to 15 C atoms, where, in addition, one or more CH$_2$ groups in these radicals may each be replaced, independently of one another, by —C≡C—, —CF$_2$O—, —CH=CH—,

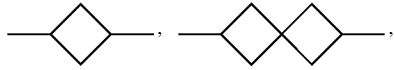

—O—, —CO—O— or —O—CO— in such a way that O atoms are not linked directly to one another, and in which, in addition, one or more H atoms may be replaced by halogen,
X$^0$ is F, Cl, CN, SF$_5$, SCN, NCS, a halogenated alkyl radical having up to 6 C atoms, a halogenated alkenyl radical having up to 6 C atoms, a halogenated alkoxy radical having up to 6 C atoms, or a halogenated alkenyloxy radical having up to 6 C atoms, and
Y$^1$ and Y$^2$ are each, independently of one another, H or F.

12. A liquid-crystalline medium according to claim 1, wherein, in addition to said one or more compounds of formula I, said medium comprises one or more compounds selected from the following formula:

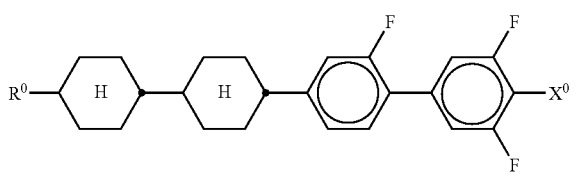

XXIa

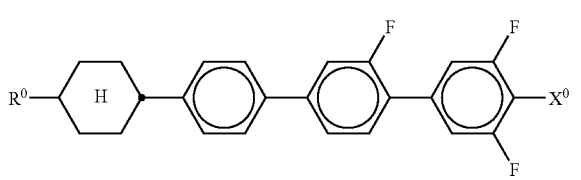

XXIIa in which
R$^0$ is an alkyl or alkoxy radical having 1 to 15 C atoms, where, in addition, one or more CH$_2$ groups in these radicals may each be replaced, independently of one another, by —C≡C—, —CF$_2$O—, —CH=CH—,

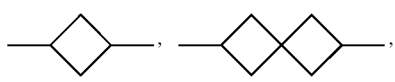

—O—, —CO—O— or —O—CO— in such a way that O atoms are not linked directly to one another, and in which, in addition, one or more H atoms may be replaced by halogen, and X⁰ is F, Cl, CN, SF₅, SCN, NCS, a halogenated alkyl radical having up to 6 C atoms, a halogenated alkenyl radical having up to 6 C atoms, a halogenated alkoxy radical having up to 6 C atoms, or a halogenated alkenyloxy radical having up to 6 C atoms.

13. A liquid-crystalline medium according to claim 4, wherein said medium comprises one or more compounds of formula VII selected from the following formulae:

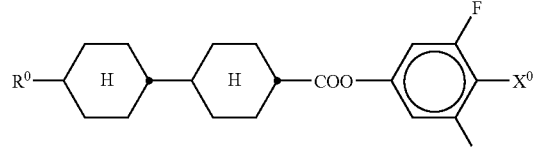

VII-2a

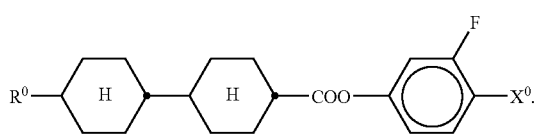

VII-2b

14. A liquid-crystalline medium according to claim 1, wherein, in addition to said one or more compounds of formula I, said medium comprises one or more compounds selected from the following formula:

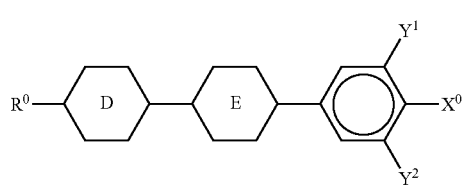

XXVII in which

R⁰ is an alkyl or alkoxy radical having 1 to 15 C atoms, where, in addition, one or more CH₂ groups in these radicals may each be replaced, independently of one another, by —C≡C—, —CF₂O—, —CH=CH—,

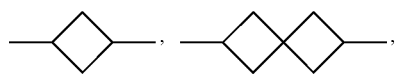

—O—, —CO—O— or —O—CO— in such a way that O atoms are not linked directly to one another, and in which, in addition, one or more H atoms may be replaced by halogen, X⁰ is F, Cl, CN, SF₅, SCN, NCS, a halogenated alkyl radical having up to 6 C atoms, a halogenated alkenyl radical having up to 6 C atoms, a halogenated alkoxy radical having up to 6 C atoms, or a halogenated alkenyloxy radical having up to 6 C atoms, Y¹⁻² are each, independently of one another, H or F, and

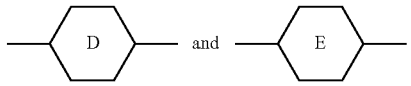

are each, independently of one another,

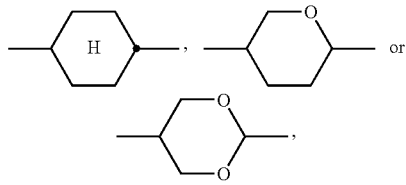

and D and E are not simultaneously cyclohexylene.

15. A liquid-crystalline medium according to claim 14, wherein said medium contains one or more compounds selected from the following formulae:

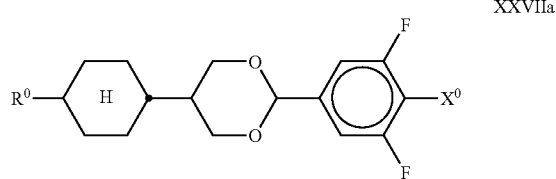

XXVIIa

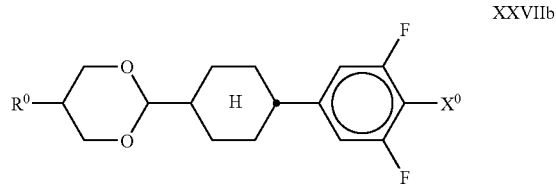

XXVIIb in which

R⁰ is an alkyl or alkoxy radical having 1 to 15 C atoms, where, in addition, one or more CH₂ groups in these radicals may each be replaced, independently of one another, by —C≡C—, —CF₂O—, —CH=CH—,

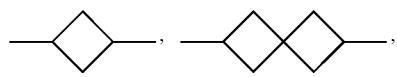

—O—, —CO—O— or —O—CO— in such a way that O atoms are not linked directly to one another, and in which, in addition, one or more H atoms may be replaced by halogen, and X⁰ is F, Cl, CN, SF₅, SCN, NCS, a halogenated alkyl radical having up to 6 C atoms, a halogenated alkenyl radical having up to 6 C atoms, a halogenated alkoxy radical having up to 6 C atoms, or a halogenated alkenyloxy radical having up to 6 C atoms.

16. A liquid-crystalline medium according to claim 1, wherein said comprises:

1-25% by weight of compounds of the formula I;
25-80% by weight of compounds of the formula II and/or III, in addition to said one or more compounds of formula I; and
5-30% by weight of compounds of the formula VI-2,

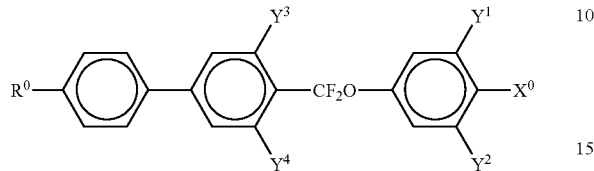

VI-2 in which
R⁰ is an alkyl or alkoxy radical having 1 to 15 C atoms, where, in addition, one or more CH₂ groups in these radicals may each be replaced, independently of one another, by —C≡C—, —CF₂O—, —CH=CH—,

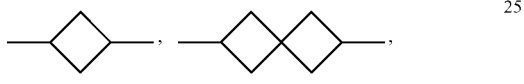

—O—, —CO—O— or —O—CO— in such a way that O atoms are not linked directly to one another, and in which, in addition, one or more H atoms may be replaced by halogen,
X⁰ is F, Cl, CN, SF₅, SCN, NCS, a halogenated alkyl radical having up to 6 C atoms, a halogenated alkenyl radical having up to 6 C atoms, a halogenated alkoxy radical having up to 6 C atoms, or a halogenated alkenyloxy radical having up to 6 C atoms, and
Y¹⁻⁴ are each, independently of one another, H or F.

17. A compound of formula I

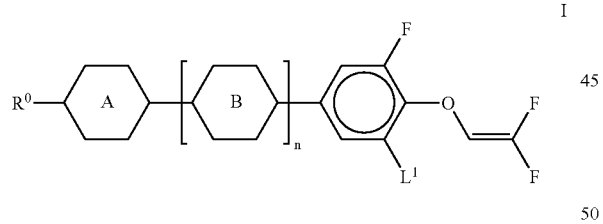

I in which
R⁰ is an alkyl or alkoxy radical having 1 to 15 C atoms, where, in addition, one or more CH₂ groups in these radicals may each be replaced, independently of one another, by —C≡C—, —CF₂O—, —CH=CH—,

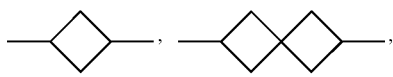

—O—, —CO—O— or —O—CO— in such a way that O atoms are not linked directly to one another, and in which, in addition, one or more H atoms may be replaced by halogen,
L¹ is H or F,
n is 2, and

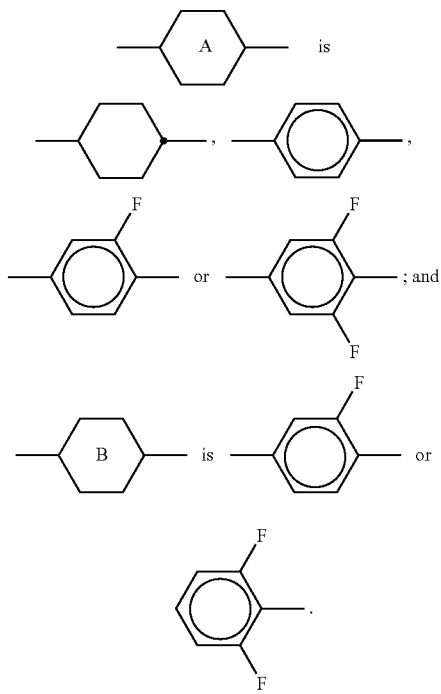

18. A compound according to claim 17, wherein L¹ is F.
19. A compound selected from the following formulae:

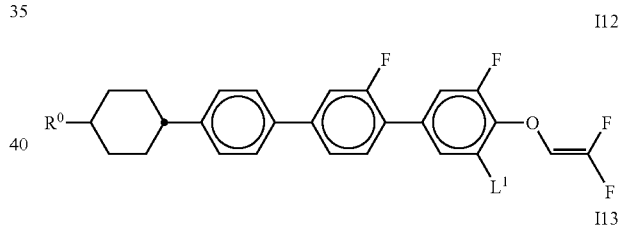

I12

I13

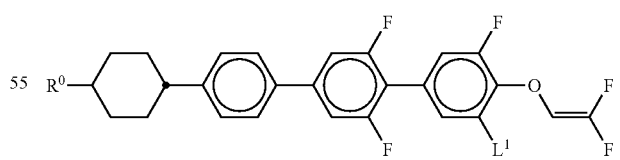

I14

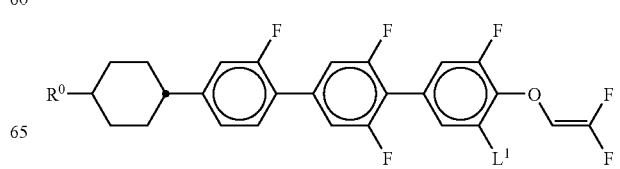

I15

-continued

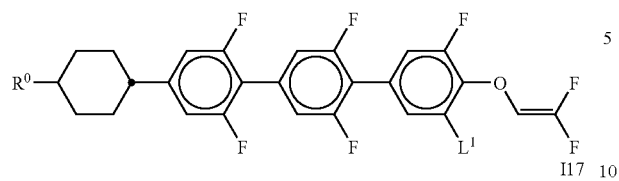
I16

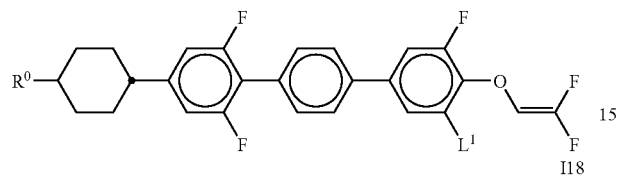
I17

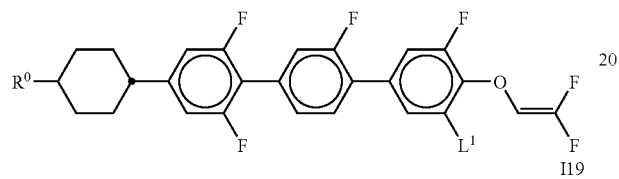
I18

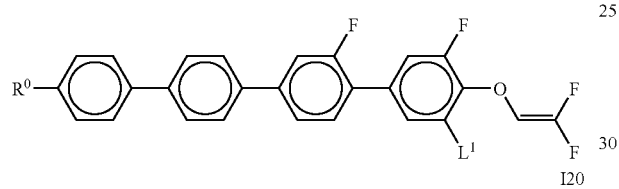
I19

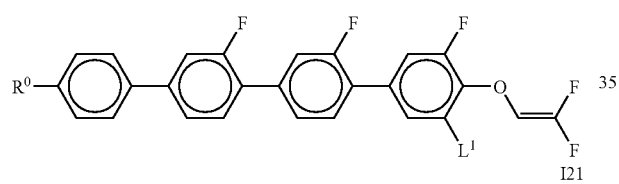
I20

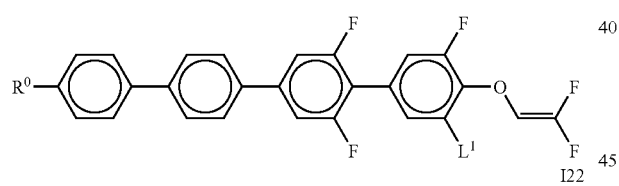
I21

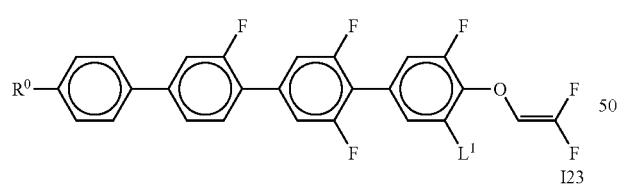
I22

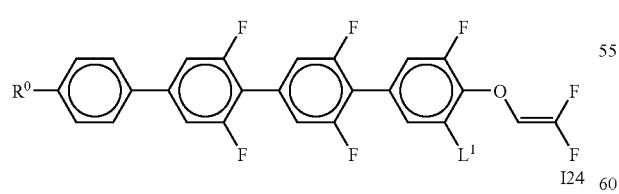
I23

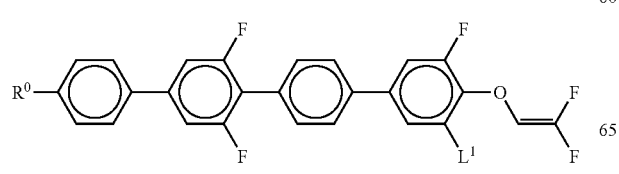
I24

-continued

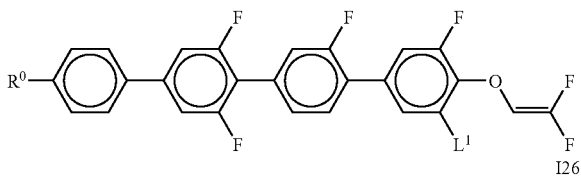
I25

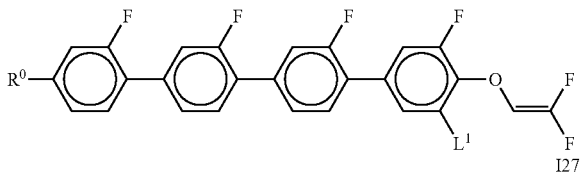
I26

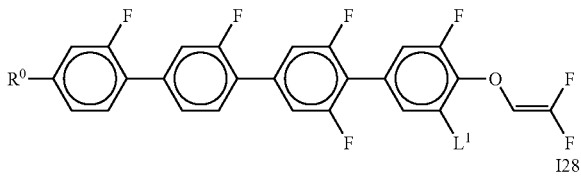
I27

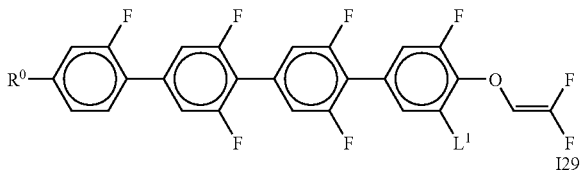
I28

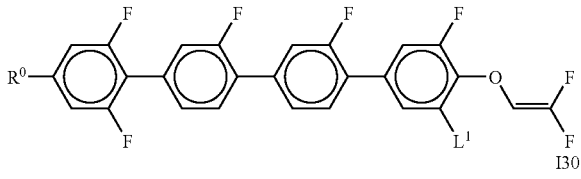
I29

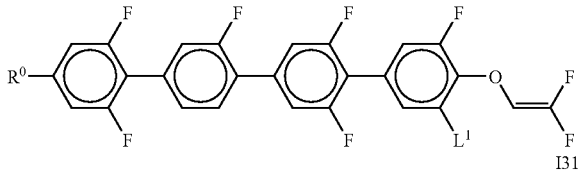
I30

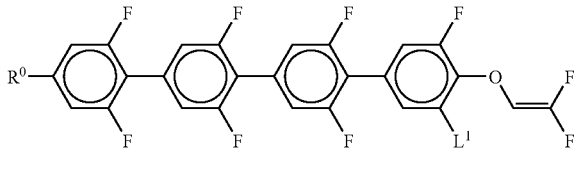
I31

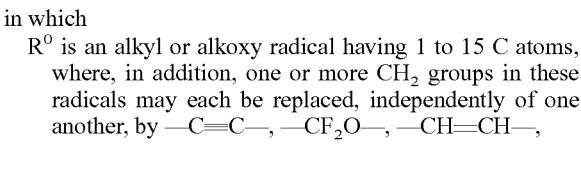

in which $R^O$ is an alkyl or alkoxy radical having 1 to 15 C atoms, where, in addition, one or more $CH_2$ groups in these radicals may each be replaced, independently of one another, by —C≡C—, —$CF_2$O—, —CH=CH—,

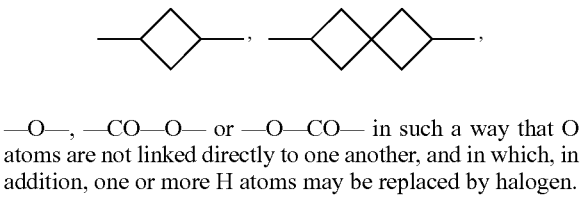

—O—, —CO—O— or —O—CO— in such a way that O atoms are not linked directly to one another, and in which, in addition, one or more H atoms may be replaced by halogen.

20. In a method of generating an electro-optical effect comprising applying a voltage to a liquid crystal display containing a liquid-crystalline medium, the improvement wherein said medium is in accordance with claim 1.

21. In a method of generating an electro-optical effect comprising applying a voltage to a liquid crystal display containing a liquid-crystalline medium, the improvement wherein said medium contains a compound according to claim 17.

22. An electro-optical liquid-crystal display containing a liquid-crystalline medium according to claim 1.

23. An electro-optical liquid-crystal display containing a liquid-crystalline medium, wherein said medium contains a compound according to claim 17.

24. A process for the preparation of a liquid-crystalline medium according to claim 1, comprising mixing one or more compounds of the formula I with one or more compounds according to formulas II and III, and with further liquid-crystalline compounds and/or additives.

25. A liquid-crystalline medium, comprising at least two liquid crystalline compounds, wherein said medium contains one or more compounds of formula I

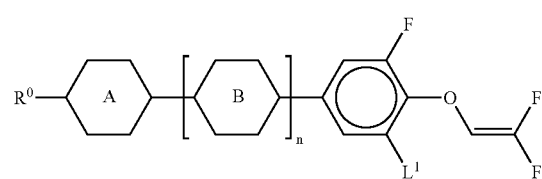

I in which
R⁰ is an alkyl or alkoxy radical having 1 to 15 C atoms, where, in addition, one or more $CH_2$ groups in these radicals may each be replaced, independently of one another, by —C≡C—, —$CF_2$O—, —CH=CH—,

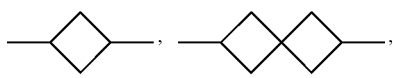

—O—, —CO—O— or —O—CO— in such a way that O atoms are not linked directly to one another, and in which, in addition, one or more H atoms may be replaced by halogen,
$L^1$ is H or F,
n is 1 or 2, and

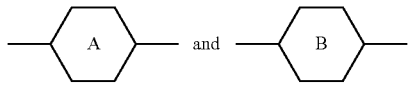

each, independently of one another, is

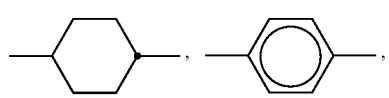

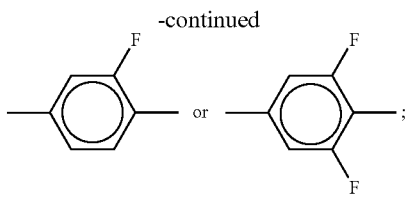

and, in addition to said one or more compounds of formula I, said medium further comprises one or more compounds selected from the following formulae:

VI-2a

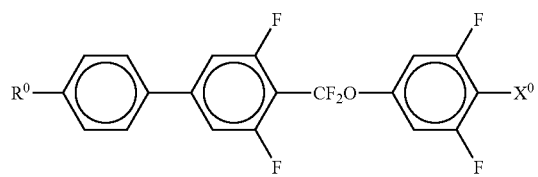

VI-2b

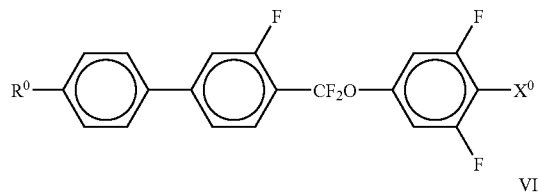

VI-2c

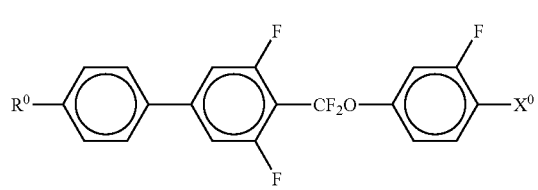

VI-2d

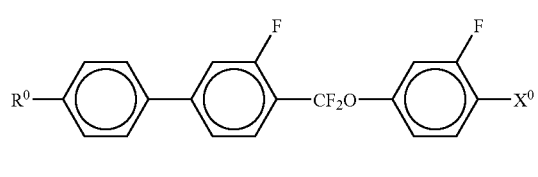

wherein
R⁰ is an alkyl or alkoxy radical having 1 to 15 C atoms, where, in addition, one or more $CH_2$ groups in these radicals may each be replaced, independently of one another, by —C≡C—, —$CF_2$O—, —CH=CH—,

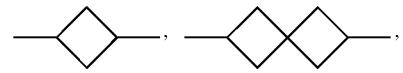

—O—, —CO—O— or —O—CO— in such a way that O atoms are not linked directly to one another, and in which, in addition, one or more H atoms may be replaced by halogen, and
X⁰ is F, Cl, CN, $SF_5$, SCN, NCS, a halogenated alkyl radical having up to 6 C atoms, a halogenated alkenyl radical having up to 6 C atoms, a halogenated alkoxy radical having up to 6 C atoms, or a halogenated alkenyloxy radical having up to 6 C atoms.

26. A liquid-crystalline medium, comprising at least two liquid crystalline compounds, wherein said medium contains one or more compounds of formula I

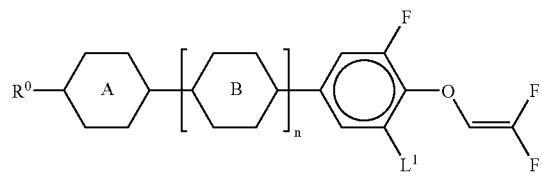

in which
R⁰ is an alkyl or alkoxy radical having 1 to 15 C atoms, where, in addition, one or more CH₂ groups in these radicals may each be replaced, independently of one another, by —C≡C—, —CF₂O—, —CH=CH—,

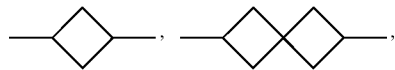

—O—, —CO—O— or —O—CO— in such a way that O atoms are not linked directly to one another, and in which, in addition, one or more H atoms may be replaced by halogen,
L¹ is H or F,
n is 1 or 2, and

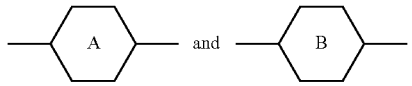 each, independently of one another, is

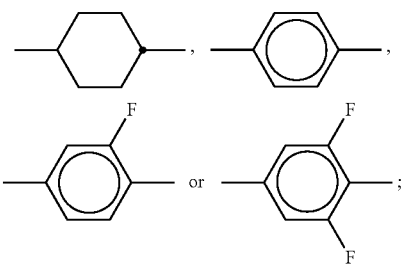

and, wherein, in addition to said one or more compounds of formula I, said medium comprises one or more compounds selected from the following formula:

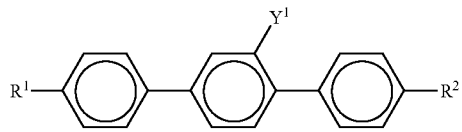

in which
R¹ and R² are each, independently of one another, n-alkyl having up to 9 C atoms, alkoxy having up to 9 C atoms, oxaalkyl having up to 9 C atoms, fluoroalkyl having up to 9 C atoms, or alkenyl having up to 9 C atoms; and
Y¹ is H or F.

* * * * *

UNITED STATES PATENT AND TRADEMARK OFFICE
CERTIFICATE OF CORRECTION

PATENT NO. : 7,807,236 B2
APPLICATION NO. : 12/024266
DATED : October 5, 2010
INVENTOR(S) : Hirschmann et al.

Page 1 of 1

It is certified that error appears in the above-identified patent and that said Letters Patent is hereby corrected as shown below:

Column 99, line 62 reads: " 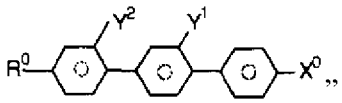 "

Should read: -- 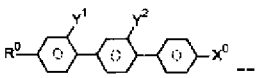 --

Column 100, line 5 reads: " 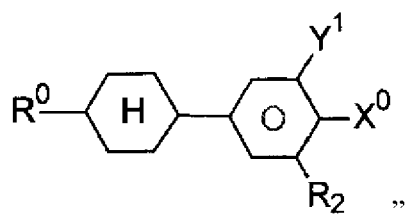 "

Should read: -- 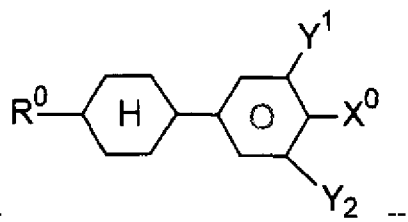 --

Signed and Sealed this
First Day of February, 2011

David J. Kappos
*Director of the United States Patent and Trademark Office*